US007086736B2

(12) United States Patent
Collins et al.

(10) Patent No.: US 7,086,736 B2
(45) Date of Patent: *Aug. 8, 2006

(54) DISPLAY SYSTEM WITH SEQUENTIAL COLOR AND WOBBLE DEVICE

(75) Inventors: David C. Collins, Philomath, OR (US); Richard E. Aufranc, Jr., Albany, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 141 days.

This patent is subject to a terminal disclaimer.

(21) Appl. No.: 10/762,086

(22) Filed: Jan. 20, 2004

(65) Prior Publication Data

US 2005/0157273 A1 Jul. 21, 2005

(51) Int. Cl.
*G03B 21/26* (2006.01)
*G03B 21/14* (2006.01)
*H04N 9/12* (2006.01)

(52) U.S. Cl. .......................... 353/30; 353/84; 348/743

(58) Field of Classification Search .................. 353/30, 353/31, 84, 94; 348/742, 743, 745, 771, 348/806
See application file for complete search history.

(56) References Cited

U.S. PATENT DOCUMENTS

| | | | | |
|---|---|---|---|---|
| 4,662,746 | A | 5/1987 | Hornbeck | |
| 4,827,334 | A | 5/1989 | Johnson et al. | |
| 4,956,619 | A | 9/1990 | Hornbeck | |
| 5,032,924 | A | 7/1991 | Brown et al. | |
| 5,061,049 | A | 10/1991 | Hornbeck | |
| 5,079,544 | A | 1/1992 | DeMond et al. | |
| 5,083,857 | A | 1/1992 | Hornbeck | |
| 5,105,265 | A | 4/1992 | Sato et al. | |
| 5,402,184 | A | 3/1995 | O'Grady et al. | |
| 5,448,314 | A * | 9/1995 | Heimbuch et al. | 348/743 |
| 5,475,428 | A * | 12/1995 | Hintz et al. | 348/263 |
| 5,490,009 | A | 2/1996 | Venkateswar et al. | |
| 5,689,283 | A | 11/1997 | Shirochi | |
| 5,842,762 | A | 12/1998 | Clarke | |
| 5,897,191 | A | 4/1999 | Clarke | |
| 5,978,518 | A | 11/1999 | Oliyide et al. | |
| 6,025,951 | A | 2/2000 | Swart et al. | |
| 6,084,235 | A * | 7/2000 | Breithaupt et al. | 250/233 |
| 6,104,375 | A | 8/2000 | Lam | |
| 6,141,039 | A | 10/2000 | Poetsch | |
| 6,184,969 | B1 | 2/2001 | Fergason | |
| 6,219,017 | B1 | 4/2001 | Shimada et al. | |
| 6,239,783 | B1 | 5/2001 | Hill et al. | |
| 6,313,888 | B1 | 11/2001 | Tabata | |

(Continued)

FOREIGN PATENT DOCUMENTS

| | | |
|---|---|---|
| EP | 0 364 043 A1 | 4/1990 |
| EP | 0 492 661 A2 | 7/1992 |

(Continued)

*Primary Examiner*—W. B. Perkey
*Assistant Examiner*—Rochelle Blackman

(57) ABSTRACT

A display system for displaying an image includes a modulator configured to produce a light beam that sequentially bears a plurality of color image sub-frames, where each color image sub-frame corresponds to one color in a plurality of colors; display optics configured to display the light beam such that the plurality of color image sub-frames are successively displayed to form the image; and a wobbling device configured to displace the light beam between display of each of the color image sub-frames such that a color image sub-frame corresponding to each color in the plurality of colors is displayed in each of a number of image sub-frame locations.

74 Claims, 15 Drawing Sheets

U.S. PATENT DOCUMENTS

| | | | | |
|---|---|---|---|---|
| 6,366,387 | B1 | 4/2002 | Wilson | |
| 6,384,816 | B1 | 5/2002 | Tabata | |
| 6,393,145 | B1 | 5/2002 | Betrisey et al. | |
| 6,577,429 | B1 * | 6/2003 | Kurtz et al. | 359/279 |
| 7,019,881 | B1 | 3/2006 | Doherty et al. | |
| 2002/0140910 | A1 * | 10/2002 | Stark et al. | 353/84 |
| 2003/0090597 | A1 * | 5/2003 | Katoh et al. | 348/744 |
| 2004/0207815 | A1 * | 10/2004 | Allen et al. | 353/31 |
| 2004/0239885 | A1 * | 12/2004 | Jaynes et al. | 353/30 |
| 2005/0024593 | A1 * | 2/2005 | Pate et al. | 353/31 |
| 2005/0078056 | A1 * | 4/2005 | Childers | 345/32 |
| 2005/0157272 | A1 * | 7/2005 | Childers | 353/84 |

FOREIGN PATENT DOCUMENTS

| | | | |
|---|---|---|---|
| EP | 0 492 721 | A2 | 7/1992 |
| EP | 0 509 630 | A2 | 10/1992 |
| EP | 1 001 306 | A2 | 5/2000 |
| GB | 2 142 203 | A | 1/1985 |
| JP | 60-132476 | | 12/1983 |
| JP | 63-292880 | | 5/1987 |
| JP | 64-47180 | | 8/1987 |
| JP | 2-216187 | | 2/1989 |
| JP | 2-250081 | | 3/1989 |

* cited by examiner

DISPLAY SYSTEM WITH SEQUENTIAL COLOR AND WOBBLE DEVICE

BACKGROUND

Many image display systems, such as monitors, projectors, or other image display systems, exist to display a still or motion picture video image. Viewers evaluate image display systems based on many criteria such as image size, contrast ratio, color purity, brightness, pixel color accuracy, and resolution. Pixel color accuracy and resolution are particularly important metrics in many display markets because the pixel color accuracy and resolution can limit the clarity and size of a displayed image.

A conventional image display system produces a displayed image by addressing an array of pixels arranged in horizontal rows and vertical columns. Because pixels have a rectangular shape, it can be difficult to represent a diagonal or curved edge of an object in a image that is to be displayed without giving that edge a stair-stepped or jagged appearance. Furthermore, if one or more of the pixels of the display system is defective; the displayed image will be affected by the defect. For example, if a pixel of the display system exhibits only an "off" position, the pixel may produce a solid black square in the displayed image. The undesirable results of pixel geometry and pixel inaccuracy are accentuated when the displayed image is projected onto a large viewing surface in color.

Many display systems create a full color display with a single modulator by creating three or more modulated images in primary colors (red, green, and blue) per video frame. The primary colors are typically derived from a white light source using a color wheel, prism, or some other color filter. The modulated images are sequentially displayed at a high rate so as to create a full color image in the human visual system. Thus, this method of generating a full color display is called "sequential color." However, in some sequential color systems, undesirable visual artifacts such as flicker may occur during the display of an image.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

In the following description, for purposes of explanation, numerous specific details are set forth in order to provide a thorough understanding of the present display system. It will be apparent; however, to one skilled in the art that the present display system may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

The term "display system" will be used herein and in the appended claims, unless otherwise specifically denoted, to refer to a projector, projection system, image display system, television system, video monitor, computer monitor system, or any other system configured to display an image. The image may be a still image, a series of images, or motion picture video. The term "image" will be used herein and in the appended claims, unless otherwise specifically denoted, to refer broadly to a still image, series of images, motion picture video, or anything else that is displayed by a display system.

Figure 1:
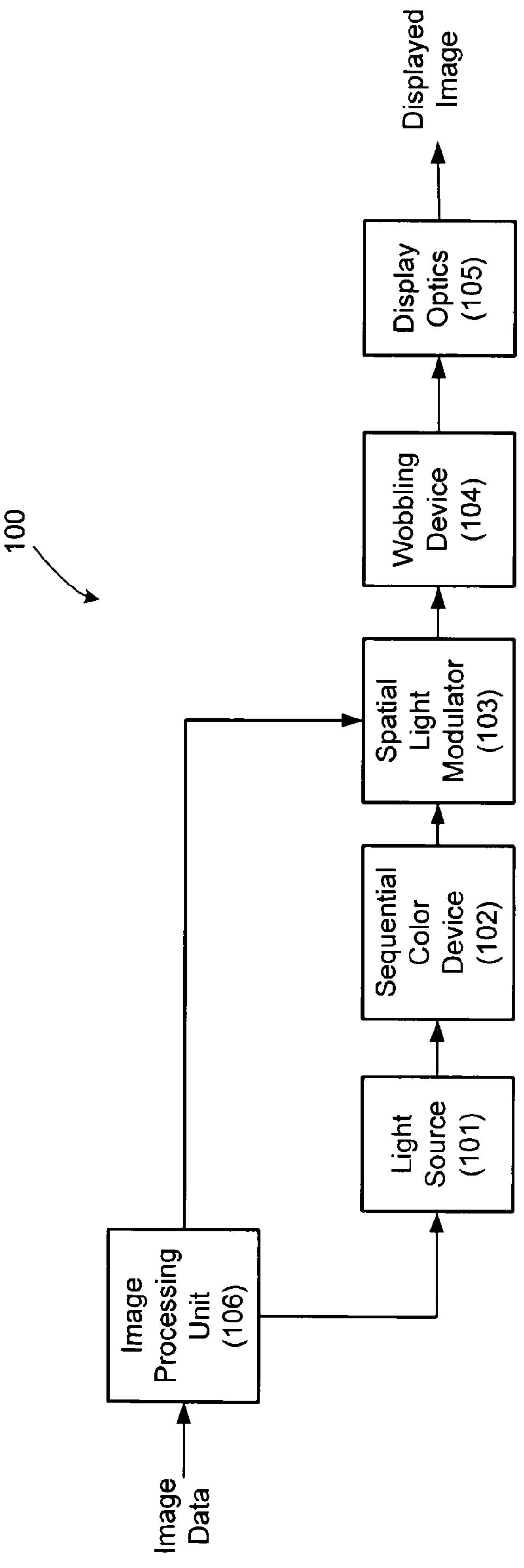
FIG. 1 illustrates an exemplary display system according to one exemplary embodiment.

FIG. 1 illustrates an exemplary display system (100) according to an exemplary embodiment. The components of FIG. 1 are exemplary only and may be modified or changed as best serves a particular application. As shown in FIG. 1, image data is input into an image processing unit (106). The image data defines an image that is to be displayed by the display system (100). While one image is illustrated and described as being processed by the image processing unit (106), it will be understood by one skilled in the art that a plurality or series of images, or motion picture video, may be processed by the image processing unit (106). The image processing unit (106) performs various functions including controlling the illumination of a light source (101) and controlling a spatial light modulator (SLM) (103). The image processing unit (106) will be explained in more detail below.

As shown in FIG. 1, the light source (101) provides a beam of light to a sequential color device (102). The light source (101) may be, but is not limited to, a high pressure mercury lamp. The sequential color device (102) enables the display system (100) to display a color image. The sequential color device (102) may be a set of rotating prisms, a color wheel, or any other device capable of providing sequential color. Sequential color and the sequential color device (102) will be explained in more detail below.

Light transmitted by the sequential color device (102) is focused onto the spatial light modulator (SLM) (103) through a lens or through some other device (not shown). SLMs are devices that modulate incident light in a spatial pattern corresponding to an electrical or optical input. The terms "SLM" and "modulator" will be used interchangeably herein to refer to a spatial light modulator. The incident light may be modulated in its phase, intensity, polarization, or direction by the modulator (103). Thus, the SLM (103) of FIG. 1 modulates the light output by the sequential color device (102) based on input from the image processing unit (106) to form an image bearing beam of light that is eventually displayed by display optics (105) on a viewing surface (not shown). The display optics (105) may comprise any device configured to display or project an image. For example, the display optics (105) may be, but are not limited to, a lens configured to project and focus an image onto a viewing surface. The viewing surface may be, but is not limited to, a screen, television, wall, liquid crystal display (LCD), or computer monitor. Alternatively, the display optics may include a view surface onto which the image is projected.

The SLM (103) may be, but is not limited to, a liquid crystal on silicon (LCOS) array or a micromirror array. LCOS and micromirror arrays are known in the art and will not be explained in detail in the present specification. An exemplary, but not exclusive, LCOS array is the Philips™ LCOS modulator. An exemplary, but not exclusive, micromirror array is the Digital Light Processing (DLP) chip available from Texas Instruments™ Inc.

Returning to FIG. 1, before the display optics (105) display the image, the modulated light may be passed through a "wobbling" device (104), according to an exemplary embodiment. A wobbling device, as will be described in detail below, is a device that is configured to enhance image resolution and hide pixel inaccuracies. An exemplary, but not exclusive, wobbling device (104) is a galvanometer mirror. The wobbling device (104) may be integrated into the SLM (103) or some other component of the display system (100) in alternative embodiments.

Figure 2:
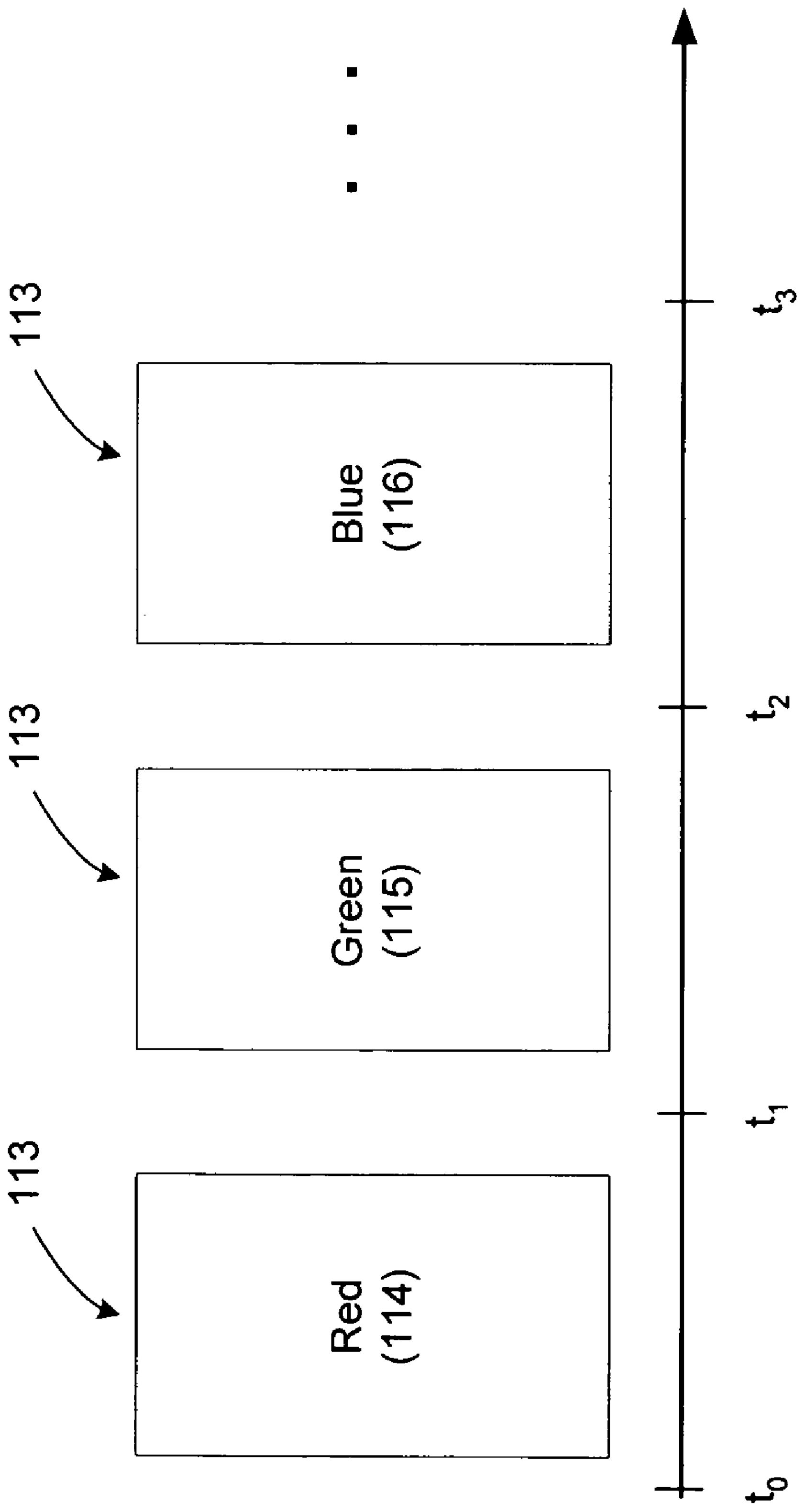
FIG. 2 illustrates the generation of a displayed image using sequential color according to one exemplary embodiment.

FIG. 2 will be used to illustrate the generation of a displayed image using sequential color. In the example of FIG. 2, the sequential color device (102; FIG. 1) uses the three primary colors—red, green, and blue. As previously mentioned, a sequential color device (102; FIG. 1) used in combination with a modulator (103; FIG. 1) enables the display system (100; FIG. 1) to display an image in full color. Sequential color display systems take advantage of the relatively slow response time of the human eye to produce a full color image. Each frame period is divided into at least three periods. During each of these periods, a primary color image is produced. If the primary color images are produced in rapid succession, the eye will perceive a single full-color-image.

FIG. 2 shows the face (113) of a modulator at different times between $t_0$ and $t_3$. As shown in FIG. 2, only one color of light is shown on the modulator face (113) during each time period. For example, between times $t_0$ and $t_1$, the sequential color device (102; FIG. 1) causes red light (114) to be shown onto the modulator face (113). The modulator face (113) may be, but is not limited to, a LCOS panel or the surface of a micromirror array, for example. Consequently, during the first time period ($t_0$ through $t_1$), the modulator (103; FIG. 1) generates a red image. Between times $t_1$ and $t_2$, the sequential color device (102; FIG. 1) causes green light (115) to be shown onto the modulator face (113). During this second time period, the modulator (103; FIG. 1) generates a green image. Finally, between times $t_2$ and $t_3$, the sequential color device (102; FIG. 1) causes blue light (116) to be shown onto the modulator face (113). During this final time period, the modulator (103; FIG. 1) generates a blue image. The red, green, and blue images are then sequentially displayed to form the displayed, full-color image. The primary colors may be sequentially shown on the modulator face (113) for subsequent images that are to be displayed.

FIG. 2 shows three colors being used by the sequential color device (102; FIG. 1) for explanatory purposes only. In an alternative embodiment, more, fewer or different colors than just the primary colors may be sequentially shown on the modulator face (113) for an image that is to be displayed. For example, the sequential color device (102; FIG. 1) may break the light emitted from the light source (101; FIG. 1) into red, green, blue, yellow, and cyan colors. The number of colors used in a sequential color display system will vary as best serves a particular application.

Figure 3:
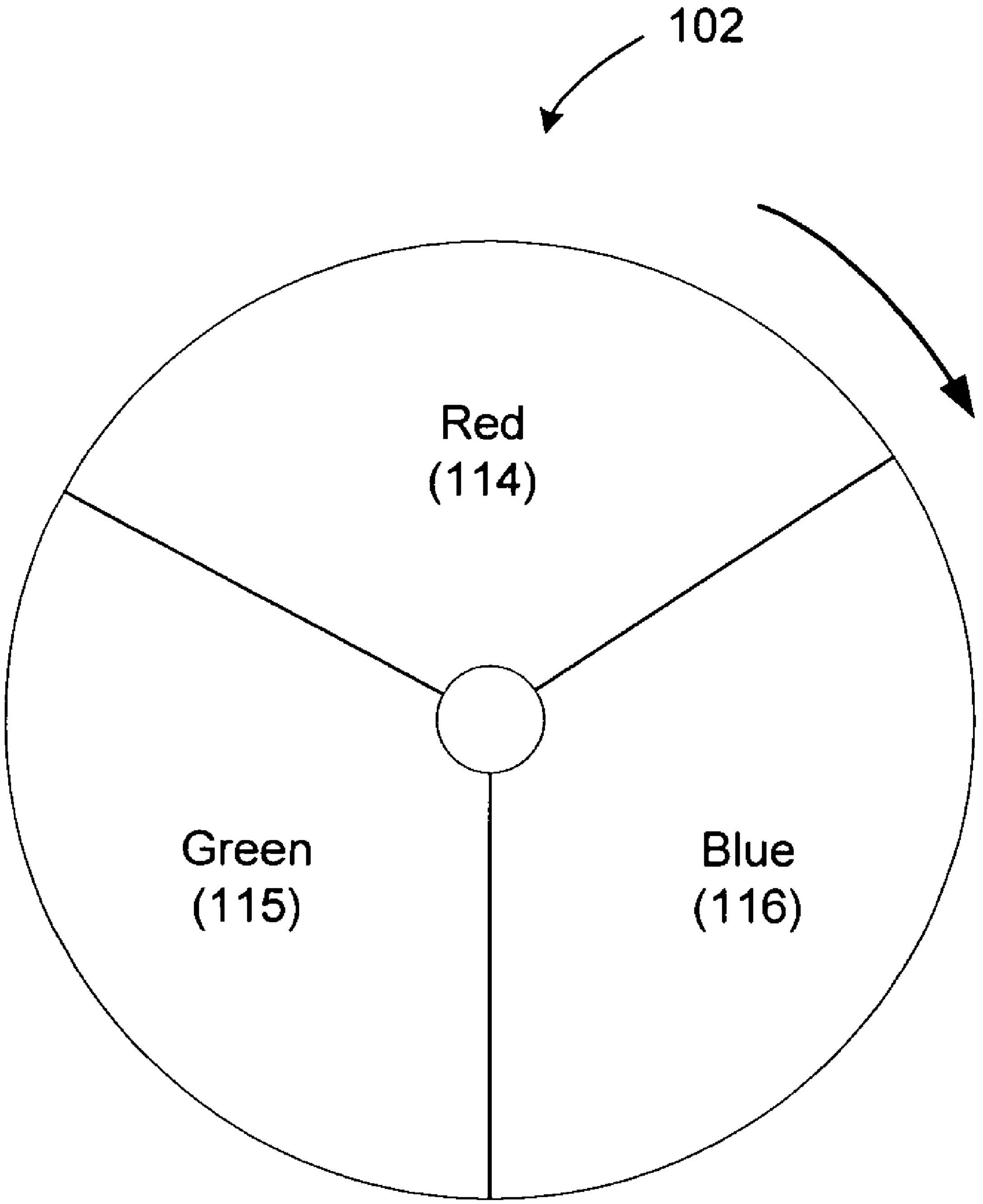
FIG. 3 illustrates an exemplary sequential color device according to one exemplary embodiment.

FIG. 3 illustrates an exemplary sequential color device (102), according to an exemplary embodiment. The sequential color device (102) of FIG. 3 is one of many different sequential color devices that may be used to effectuate sequential color in a display system. The exemplary sequential color device (102) of FIG. 3 is a color wheel that spins about a central axis. The color wheel is divided into a red (114) filter region, a green filter region (115), and a blue (116) filter region. Each filter region only allows its respective color of light to pass through the color wheel by blocking the transmission of undesired light wavelengths. For example, if a beam of white light is focused onto the red (114) filter region, only red light will be allowed to pass through the color wheel. The color wheel is configured to spin such that a sequence of red (114), green (115), and blue (116) light is passed to the modulator (103; FIG. 1). In other embodiments, the color wheel may provide these colors in a different sequence or a different set of sequential colors.

Figure 4:
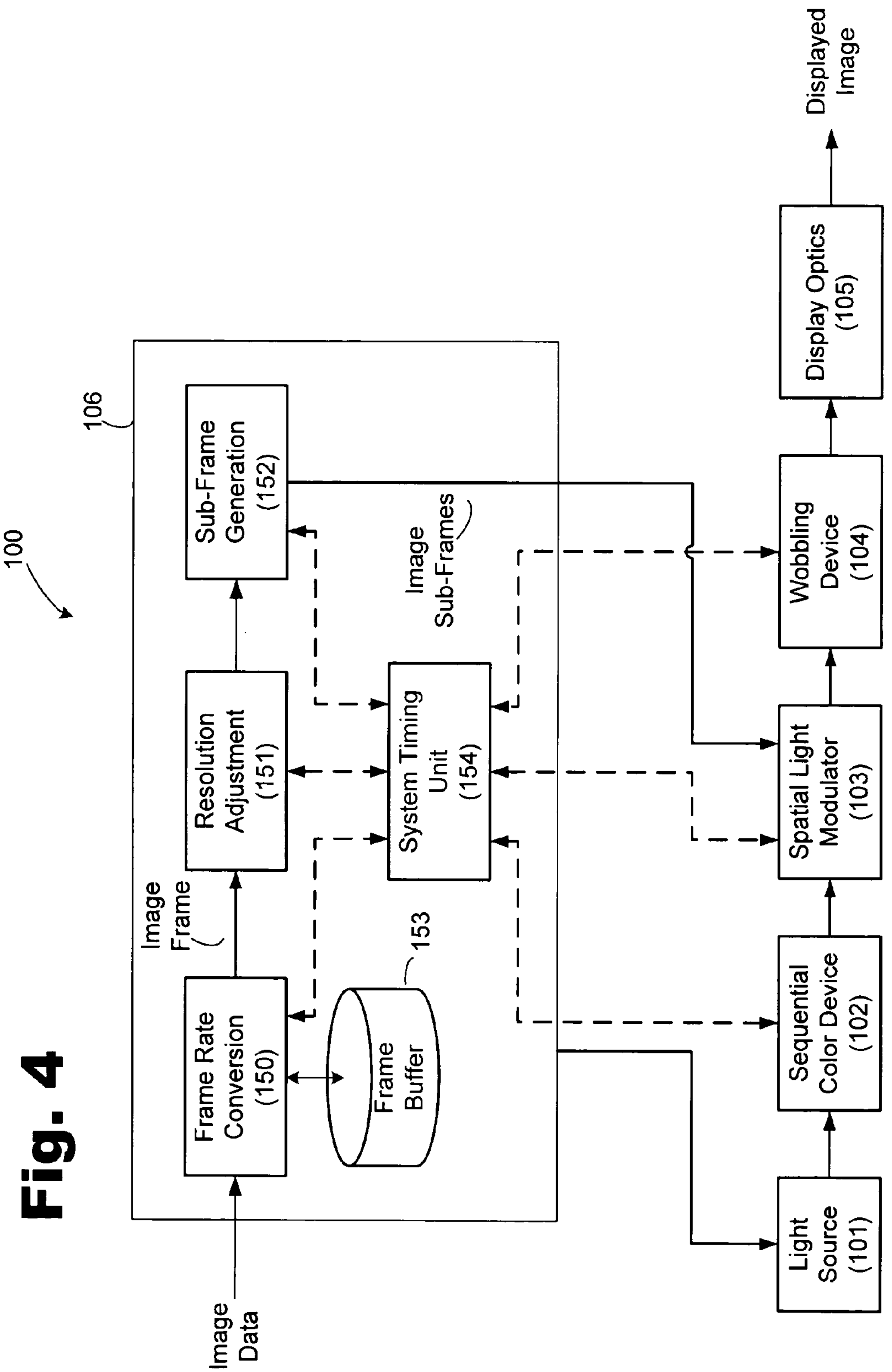
FIG. 4 illustrates an exemplary display system with an expanded view of exemplary functions inside the image processing unit according to one exemplary embodiment.

FIG. 4 illustrates the same display system (100) of FIG. 1 with an expanded view of exemplary functions inside the image processing unit (106). In one embodiment, as shown in FIG. 4, the image processing unit (106) comprises a frame rate conversion unit (150) and an image frame buffer (153). As described below, the frame rate conversion unit (150) and the image frame buffer (153) receive and buffer the image data to create an image frame corresponding to the image data. In addition, the image processing unit (106) may further comprise a resolution adjustment function (151), a sub-frame generation function (152), and a system timing unit (154). The resolution adjustment function (151), as will be explained below, adjusts the resolution of the frame to match the resolution capability of the display system (100). The sub-frame generation function (152) processes the image frame data to define one or more image sub-frames corresponding to the image frame. The sub-frames, as will be explained below, are displayed by the display system (100) to produce a displayed image. The system timing unit (154), as will also be explained below, may synchronize the timing of the various components of the display system (100).

The image processing unit (106), including the frame rate conversion unit (150), the resolution adjustment function (151), the sub-frame generation function (152), and/or the system timing unit (154), includes hardware, software, firmware, or a combination of these. In one embodiment, one or more components of the image processing unit (106) are included in a computer, computer server, or other microprocessor-based system capable of performing a sequence of logic operations. In addition, the image processing may be distributed throughout the display system (100) with individual portions of the image processing unit (106) being implemented in separate system components.

According to one embodiment, the image data may comprise digital image data, analog image data, or a combination of analog and digital data. The image processing unit (106) may be configured to receive and process digital image data and/or analog image data.

The frame rate conversion unit (150) receives the image data corresponding to an image that is to be displayed by the display system (100) and buffers or stores the image data in the image frame buffer (153). More specifically, the frame rate conversion unit (150) receives image data representing individual lines or fields of the image and buffers the image data in the image frame buffer (153) to create an image frame that corresponds to the image that is to be displayed by the display system (100). The image frame buffer (153) may buffer the image data by receiving and storing all of the image data corresponding to the image frame and the frame rate conversion unit (150) may generate the image frame by subsequently retrieving or extracting all of the image data for the image frame from the image frame buffer (153). As such, the image frame is defined to comprise a plurality of individual lines or fields of image data representing an entirety of the image that is to be displayed by the display system (100). Thus, the image frame includes a plurality of columns and a plurality of rows of individual pixels representing the image that is to be displayed by the display system (100).

The frame rate conversion unit (150) and the image frame buffer (153) can receive and process image data as progressive image data and/or interlaced image data. With progressive image data, the frame rate conversion unit (150) and the image frame buffer (153) receive and store sequential fields of image data for the image. Thus, the frame rate conversion unit (150) creates the image frame by retrieving the sequential fields of the image data for the image. With interlaced image data, the frame rate conversion unit (150) and the image frame buffer (153) receive and store the odd fields and the even fields of the image data for the image. For example, all of the odd fields of the image data are received and stored and all of the even fields of the image data are received and stored. As such, the frame rate conversion unit (150) de-interlaces the image data and creates the image frame by retrieving the odd and even fields of the image data for the image.

The image frame buffer (153) includes memory for storing the image data for one or more image frames of respective images. For example, the image frame buffer (153) may comprise non-volatile memory such as a hard disk drive or other persistent storage device or include volatile memory such as random access memory (RAM).

By receiving the image data at the frame rate conversion unit (150) and buffering the image data in the image frame buffer (153), the input timing of the image data can be decoupled from timing requirements of the remaining components in the display system (100) (e.g.; the SLM (103), the wobbling device (104), and the display optics (105)). More specifically, since the image data for the image frame is received and stored by the image frame buffer (153), the image data may be received at any input rate. As such, the frame rate of the image frame may be converted to the timing requirement of the remaining components in the display system (100). For example, the image data may be received by the image processing unit (106) at a rate of 30 frames per second while the SLM (103) may be configured to operate at 60 frames per second. In this case, the frame rate conversion unit (150) converts the frame rate from 30 frames per second to 60 frames per second.

In one embodiment, the image processing unit (106) may include a resolution adjustment function (151) and a sub-frame generation unit (152). As described below, the resolution adjustment function (151) receives image data for an image frame and adjusts a resolution of the image data. More specifically, the image processing unit (106) receives image data for the image frame at an original resolution and processes the image data to match the resolution that the display system (100) is configured to display. In an exemplary embodiment, the image processing unit (106) increases, decreases, and/or leaves unaltered the resolution of the image data so as to match the resolution that the display system (100) is configured to display.

In one embodiment, the sub-frame generation unit (152) receives and processes image data for an image frame and defines a number of image sub-frames corresponding to the image frame. If the resolution adjustment unit (151) has adjusted the resolution of the image data, the sub-frame generation unit (152) receives the image data at the adjusted resolution. Each of the image sub-frames comprises a data array or matrix that represents a subset of the image data corresponding to the image that is to be displayed. The data arrays comprise pixel data defining the content of pixels in a pixel area equal to the pixel area of the corresponding image frame. Because, as will be explained below, each image sub-frame is displayed in spatially different image sub-frame locations, each of the image sub-frames' data arrays comprise slightly different pixel data. In one embodiment, the image processing unit (106) may only generate image sub-frames corresponding to an image that is to be displayed as opposed to generating both an image frame and corresponding image sub-frames. The image sub-frames will now be explained in more detail.

As mentioned, each image sub-frame in a group of image sub-frames corresponding to an image frame comprises a matrix or array of pixel data corresponding to an image to be displayed. In one embodiment, each image sub-frame is input to the SLM (103). The SLM (103) modulates a light beam in accordance with the sub-frames and generates a light beam bearing the sub-frames. The light beam bearing the individual image sub-frames is eventually displayed by the display optics (105) to create a displayed image. However, after light corresponding to each image sub-frame in a group of sub-frames is modulated by the SLM (103) and before each image sub-frame is displayed by the display optics (105), the wobbling device (104) shifts the position of the light path between the SLM (103) and the display optics (105). In other words, the wobbling device shifts the pixels such that each image sub-frame is displayed by the display optics (105) in a slightly different spatial position than the previously displayed image sub-frame. Thus, because the image sub-frames corresponding to a given image are spatially offset from one another, each image sub-frame includes different pixels and/or portions of pixels. The wobbling device (104) may shift the pixels such that the image sub-frames are offset from each other by a vertical distance and/or by a horizontal distance, as will be described below.

According to an exemplary embodiment, each of the image sub-frames in a group of sub-frames corresponding to an image is displayed by the display optics (105) at a high rate such that the human eye cannot detect the rapid succession between the image sub-frames. Instead, the rapid succession of the image sub-frames appears as a single displayed image. As will now be described in detail, by sequentially displaying the image sub-frames in spatially different positions, the apparent resolution of the finally displayed image is enhanced.

FIGS. 5–8 will be used to illustrate an exemplary spatial displacement of image sub-frames by an exemplary wobbling device. It will then be shown that sequential color may be combined with the spatial displacement of the image sub-frames to produce a displayed color image.

Figure 5A:
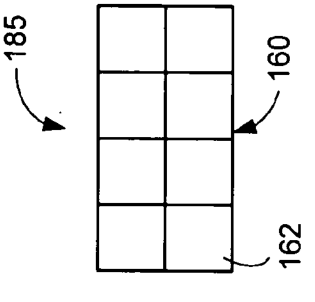
FIGS. 5A–C illustrate that a number of image sub-frames may be generated for a particular image according to one exemplary embodiment.
Figure 5B:
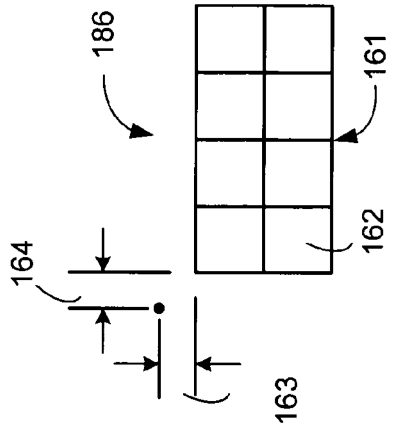
Figure 5C:
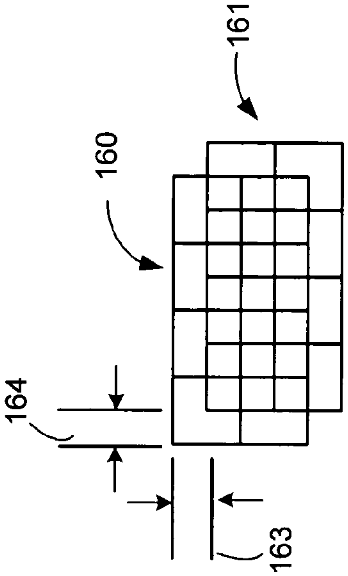

FIGS. 5A–C illustrate an exemplary embodiment wherein a number of image sub-frames are generated for a particular image. As illustrated in FIGS. 5A–C, the exemplary image processing unit (106) generates two image sub-frames for a particular image. More specifically, the image processing unit (106) generates a first sub-frame (160) and a second sub-frame (161) for the image frame. Although the image sub-frames in this example and in subsequent examples are generated by the image processing unit (106), it will be understood that the image sub-frames may be generated by the sub-frame generation function (152) or by a different component of the display system (100). The first sub-frame (160) and the second sub-frame (161) each comprise a data array of a subset of the image data for the corresponding image frame. Although the exemplary image processing unit (106) generates two image sub-frames in the example of FIGS. 5A–C, it will be understood that two image sub-frames are an exemplary number of image sub-frames that may be generated by the image processing unit (106) and that any number of image sub-frames may be generated in other embodiments.

As illustrated in FIG. 5B, the first image sub-frame (160) is displayed in a first image sub-frame location (185). The second sub-frame (161) is displayed in a second image sub-frame location (186) that is offset from the first sub-frame location (185) by a vertical distance (163) and a horizontal distance (164). As such, the second sub-frame (161) is spatially offset from the first sub-frame (160) by a predetermined distance. In one illustrative embodiment, as shown in FIG. 5C, the vertical distance (163) and horizontal distance (164) are each approximately one-half of one pixel. However, the spatial offset distance between the first image sub-frame location (185) and the second image sub-frame location (186) may vary as best serves a particular application. In an alternative embodiment, the first sub-frame (160) and the second sub-frame (161) may only be offset in either the vertical direction or in the horizontal direction in an alternative embodiment. In one embodiment, the wobbling device (104; FIG. 4) is configured to offset the beam of light between the SLM (103; FIG. 4) and the display optics (105; FIG. 4) such that the first and second sub-frames (160, 161; FIG. 5) are spatially offset from each other.

As illustrated in FIG. 5C, the display system (100; FIG. 4) alternates between displaying the first sub-frame (160) in the first image sub-frame location (185) and displaying the second sub-frame (161) in the second image sub-frame location (186) that is spatially offset from the first image sub-frame location (185). More specifically, the wobbling device (104; FIG. 4) shifts the display of the second sub-frame (161) relative to the display of the first sub-frame (160) by the vertical distance (163) and by the horizontal distance (164). As such, the pixels of the first sub-frame (160) overlap the pixels of the second sub-frame (161). In one embodiment, the display system (100; FIG. 4) completes one cycle of displaying the first sub-frame (160) in the first image sub-frame location (185) and displaying the second sub-frame (161) in the second image sub-frame location (186) resulting in a displayed image with an enhanced apparent resolution. Thus, the second sub-frame (161) is spatially and temporally displaced relative to the first sub-frame (160). However the two sub-frames are seen together by an observer as an enhanced single image.

Figure 6B:
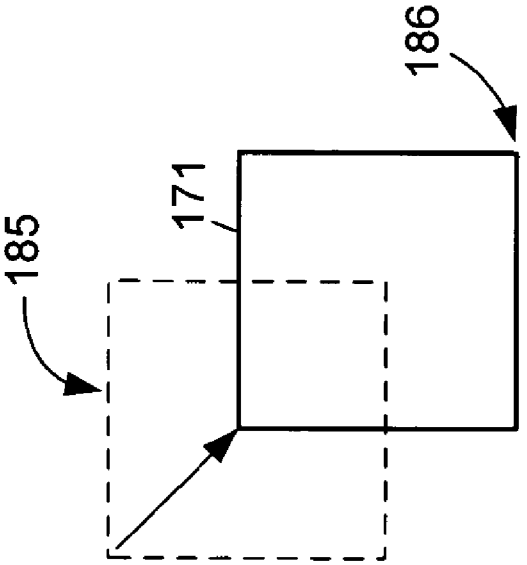
FIGS. 6A–B illustrate displaying a pixel from the first sub-frame in a first image sub-frame location and displaying a pixel from the second sub-frame in the second image sub-frame location according to one exemplary embodiment.
Figure 6A:
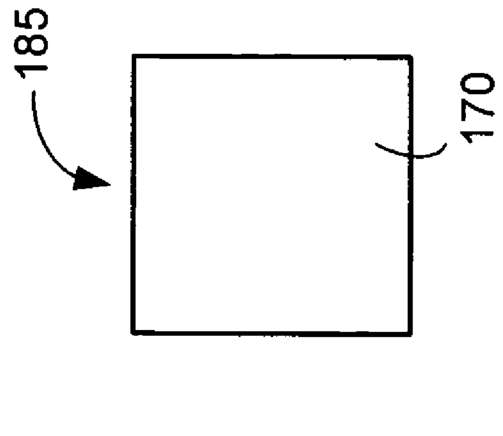

FIGS. 6A–B illustrate an exemplary embodiment of completing one cycle of displaying a pixel (170) from the first sub-frame (160) in the first image sub-frame location (185) and displaying a pixel (171) from the second sub-frame (161) in the second image sub-frame location (186). FIG. 6A illustrates the display of the pixel (170) from the first sub-frame (160) in the first image sub-frame location (185). FIG. 6B illustrates the display of the pixel (171) from the second sub-frame (161) in the second image sub-frame location (186). In FIG. 6B, the first image sub-frame location (185) is illustrated by dashed lines.

Thus, by generating a first and second sub-frame (160, 161) and displaying the two sub-frames in the spatially offset manner as illustrated in FIGS. 5A–C and FIGS. 6A–B, twice the amount of pixel data is used to create the finally displayed image as compared to the amount of pixel data used to create a finally displayed image without using the image sub-frames. Accordingly, with two-position processing, the resolution of the finally displayed image is increased by a factor of approximately 1.4 or the square root of two.

In another embodiment, as illustrated in FIGS. 7A–D, the image processing unit (106) defines four image sub-frames for an image frame. More specifically, the image processing unit (106) defines a first sub-frame (160), a second sub-frame (161), a third sub-frame (180), and a fourth sub-frame (181) for the image frame. As such, the first sub-frame (160), the second sub-frame (161), the third sub-frame (180), and the fourth sub-frame (181) each comprise a data array of a subset of the image data for the corresponding image frame.

Figure 7A:
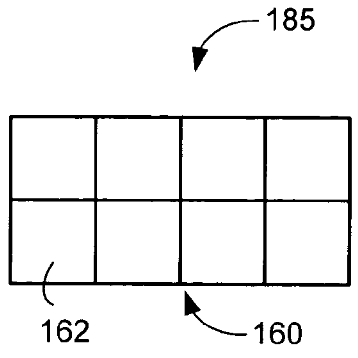
FIGS. 7A–D illustrate that the sub-frame generation function may define four image sub-frames for an image frame according to one exemplary embodiment.
Figure 7B:
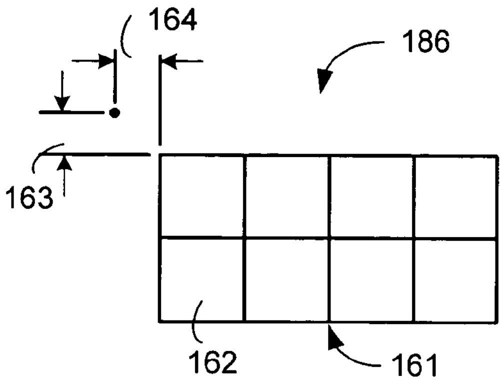
Figure 7C:
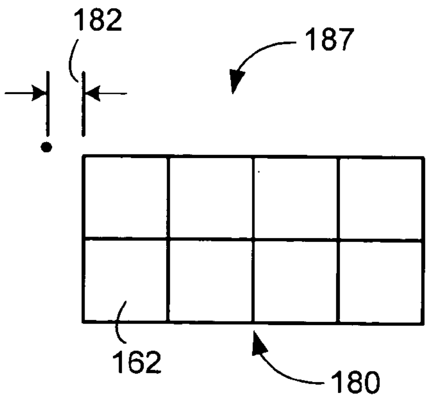
Figure 7D:
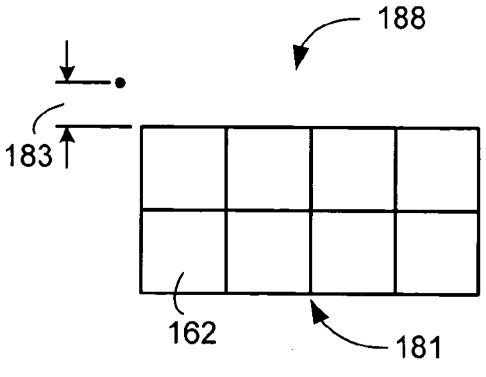

In one embodiment, as illustrated in FIG. 7B–D, the first image sub-frame (160) is displayed in a first image sub-frame location (185). The second image sub-frame (161) is displayed in a second image sub-frame location (186) that is offset from the first sub-frame location (185) by a vertical distance (163) and a horizontal distance (164). The third sub-frame (180) is displayed in a third image sub-frame location (187) that is offset from the first sub-frame location (185) by a horizontal distance (182). The horizontal distance (182) may be, for example, the same distance as the horizontal distance (164). The fourth sub-frame (181) is displayed in a fourth image sub-frame location (188) that is offset from the first sub-frame location (185) by a vertical distance (183). The vertical distance (183) may be, for example, the same distance as the vertical distance (163). As such, the second sub-frame (161), the third sub-frame (180), and the fourth sub-frame (181) are each spatially offset from each other and spatially offset from the first sub-frame (160) by a predetermined distance. In one illustrative embodiment, the vertical distance (163), the horizontal distance (164), the horizontal distance (182), and the vertical distance (183) are each approximately one-half of one pixel. However, the spatial offset distance between the four sub-frames may vary as best serves a particular application. In one embodiment, the wobbling device (104; FIG. 4) is configured to offset the beam of light between the SLM (103; FIG. 4) and the display optics (105; FIG. 4) such that the first, second, third, and fourth sub-frames (160, 161, 180, 181; FIG. 5) are spatially offset from each other.

In one embodiment, the display system (100; FIG. 4) completes one cycle of displaying the first sub-frame (160) in the first image sub-frame location (185), displaying the second sub-frame (161) in the second image sub-frame location (186), displaying the third sub-frame (180) in the third image sub-frame location (187), and displaying the fourth sub-frame (181) in the fourth image sub-frame location (188) resulting in a displayed image with an enhanced apparent resolution. Thus the second sub-frame (161), the third sub-frame (180), and the fourth sub-frame (181) are spatially and temporally displaced relative to each other and relative to first sub-frame (160).

Figure 8A:
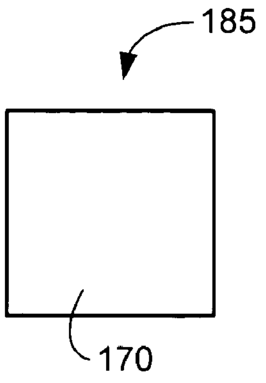
FIGS. 8A–D illustrate displaying a pixel from the first sub-frame in a first image sub-frame location, displaying a pixel from the second sub-frame in a second image sub-frame location, displaying a pixel from the third sub-frame in a third image sub-frame location, and displaying a pixel from the fourth sub-frame in a fourth image sub-frame location according to one exemplary embodiment.
Figure 8B:
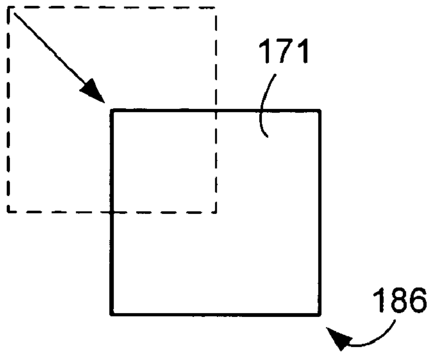
Figure 8C:
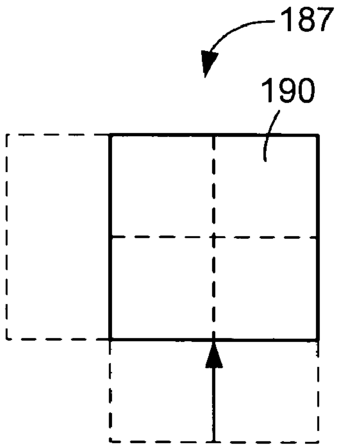
Figure 8D:
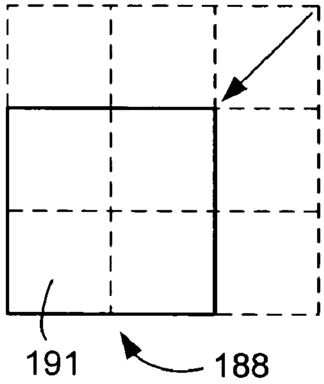

FIGS. 8A–D illustrate an exemplary embodiment of completing one cycle of displaying a pixel (170) from the first sub-frame (160) in the first image sub-frame location (185), displaying a pixel (171) from the second sub-frame (161) in the second image sub-frame location (186), displaying a pixel (190) from the third sub-frame (180) in the third image sub-frame location (187), and displaying a pixel (191) from the fourth sub-frame (170) in the fourth image sub-frame location (188). FIG. 8A illustrates the display of the pixel (170) from the first sub-frame (160) in the first image sub-frame location (185). FIG. 8B illustrates the display of the pixel (171) from the second sub-frame (161) in the second image sub-frame location (186) (with the first image sub-frame location being illustrated by dashed lines). FIG. 8C illustrates the display of the pixel (190) from the third sub-frame (180) in the third image sub-frame location (187) (with the first position and the second position being illustrated by dashed lines). Finally, FIG. 8D illustrates the display of the pixel (191) from the fourth sub-frame (170) in the fourth image sub-frame location (188) (with the first position, the second position, and the third position being illustrated by dashed lines).

Thus, by generating four image sub-frames and displaying the four sub-frames in the spatially offset manner as illustrated in FIGS. 7A–D and FIGS. 8A–D, four times the amount of pixel data is used to create the finally displayed image as compared to the amount of pixel data used to create a finally displayed image without using the image sub-frames. Accordingly, with four-position processing, the resolution of the finally displayed image is increased by a factor of two or the square root of four.

Thus, as shown by the examples in FIGS. 5–8, by generating a number of image sub-frames for an image frame and spatially and temporally displaying the image sub-frames relative to each other, the display system (100; FIG. 4) can produce a displayed image with a resolution greater than that which the SLM (103; FIG. 4) is configured to display. In one illustrative embodiment, for example, with image data having a resolution of 800 pixels by 600 pixels and the SLM (103; FIG. 4) having a resolution of 800 pixels by 600 pixels, four-position processing by the display system (100; FIG. 5) with resolution adjustment of the image data produces a displayed image with a resolution of 1600 pixels by 1200 pixels.

In addition, by overlapping pixels of image sub-frames, the display system (100; FIG. 4) may reduce the undesirable visual effects caused by a defective pixel. For example, if four sub-frames are generated by the image processing unit (106; FIG. 4) and displayed in offset positions relative to each other, the four sub-frames effectively diffuse the undesirable effect of the defective pixel because a different portion of the image that is to be displayed is associated with the defective pixel in each sub-frame. A defective pixel is defined to include an aberrant or inoperative display pixel such as a pixel which exhibits only an "on" or "off" position, a pixel which produces less intensity or more intensity than intended, and/or a pixel with inconsistent or random operation.

Figure 9:
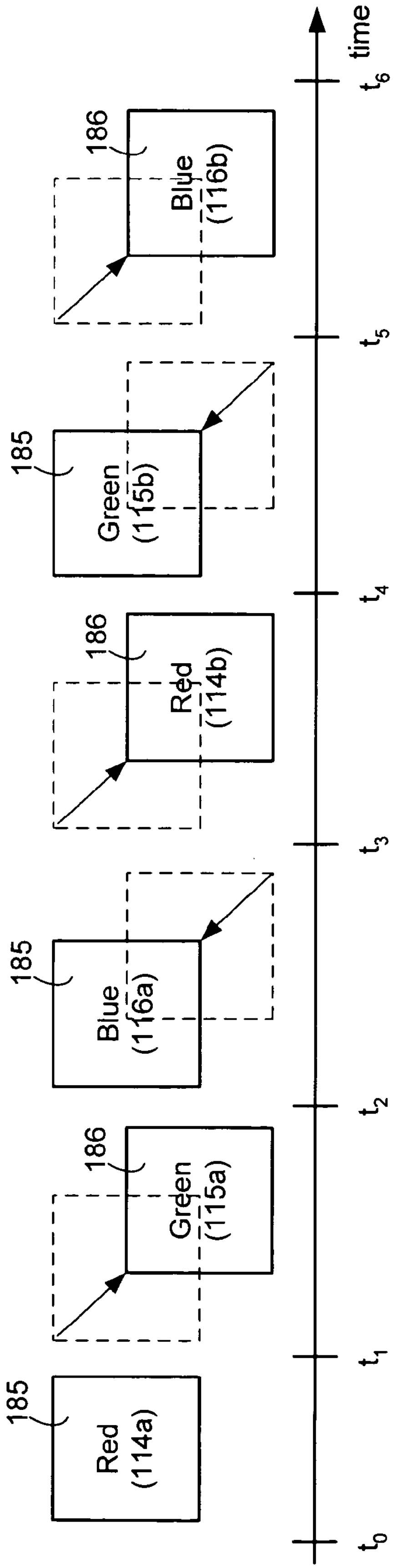
FIG. 9 illustrates an exemplary embodiment wherein the wobbling device shifts the display position of the image sub-frames between two image sub-frame locations.

As mentioned, a sequential color device may be used in combination with a wobbling device to produce a color image with enhanced resolution. To facilitate sequential color, the image processing unit (106; FIG. 4) generates an image sub-frame for each color that is to be displayed in each image sub-frame location. For example, as shown in FIG. 9, if the sequential color device (102; FIG. 4) is configured to sequentially apply the primary colors to image sub-frames that are provided to the modulator (103; FIG. 4) and if the wobbling device (104; FIG. 4) is configured to alternate the display of the image sub-frames between two different spatial locations, the image processing unit (106; FIG. 4) generates three image sub-frames for the first image sub-frame location (185) and three image sub-frames for the second image sub-frame location (186). In one embodiment, the sequential color device (102; FIG. 4) and the wobbling device (104; FIG. 4) are configured such that a red (114) image sub-frame, a green (115) image sub-frame, and a blue (116) image sub-frame are each displayed in both the first image sub-frame location (185) and in the second image sub-frame location (186).

In one embodiment, as shown in FIG. 9, the wobbling device (104; FIG. 4) shifts the display position of the image sub-frames between each color change. For example, FIG. 9 shows a sequence of six image sub-frames that are displayed in alternating spatial positions. First, a red image sub-frame (114*a*) is displayed in the first image sub-frame location (185) between times $t_0$ and $t_1$. The wobbling device (104; FIG. 4) then shifts the position of the light beam bearing the image sub-frames such that the next image sub-frame, which is a green image sub-frame (115*a*), is displayed in the second image sub-frame location (186) between times $t_1$ and $t_2$. The wobbling device (104; FIG. 4) then shifts the position of the light beam bearing the image sub-frames such that the next image sub-frame, which is a blue image sub-frame (116*a*), is displayed in the first image sub-frame location (185) between times $t_2$ and $t_3$. This process of alternating the position of the image sub-frames is repeated for the remaining image sub-frames that are to be displayed. Thus, a second red image sub-frame (114*b*) is displayed in the second image sub-frame location (186) between times $t_3$ and $t_4$, a second green image sub-frame (115*b*) is displayed in the first image sub-frame location (185) between times $t_4$ and $t_5$, and a second blue image sub-frame (116*b*) is displayed in the second image sub-frame location (186) between times $t_5$ and $t_6$. The order in which the primary colors are displayed may vary as best serves a particular application. For example, blue may be displayed first instead of red. Furthermore, red, green, and blue are exemplary colors that may be sequentially displayed. It will be understood that any combination of colors may be sequentially displayed.

Figure 10:
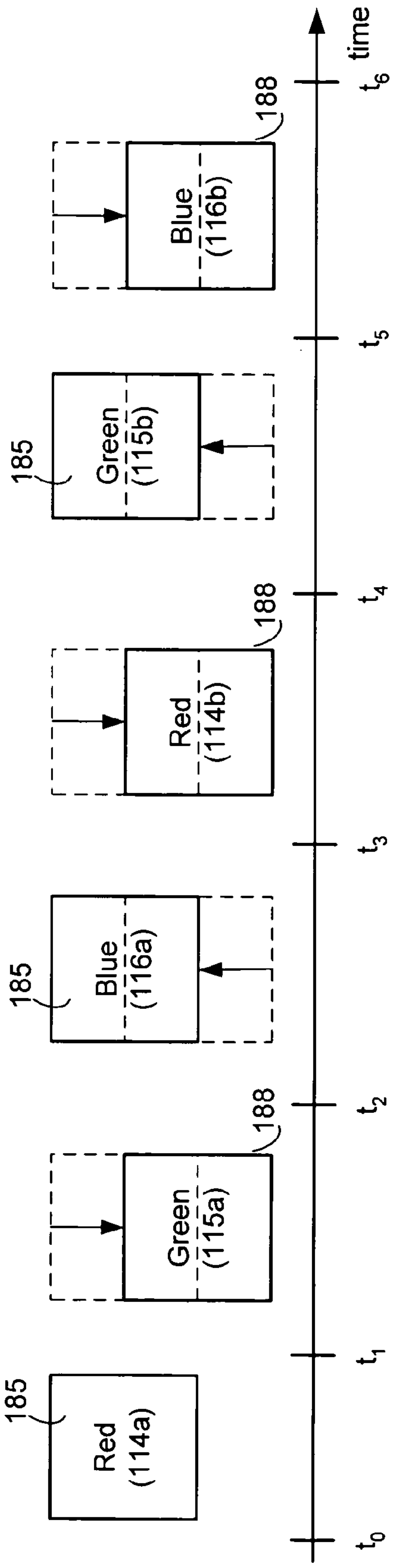
FIG. 10 illustrates an exemplary embodiment wherein the wobbling device vertically shifts the display position of the image sub-frames between two image sub-frame locations.
Figure 11:
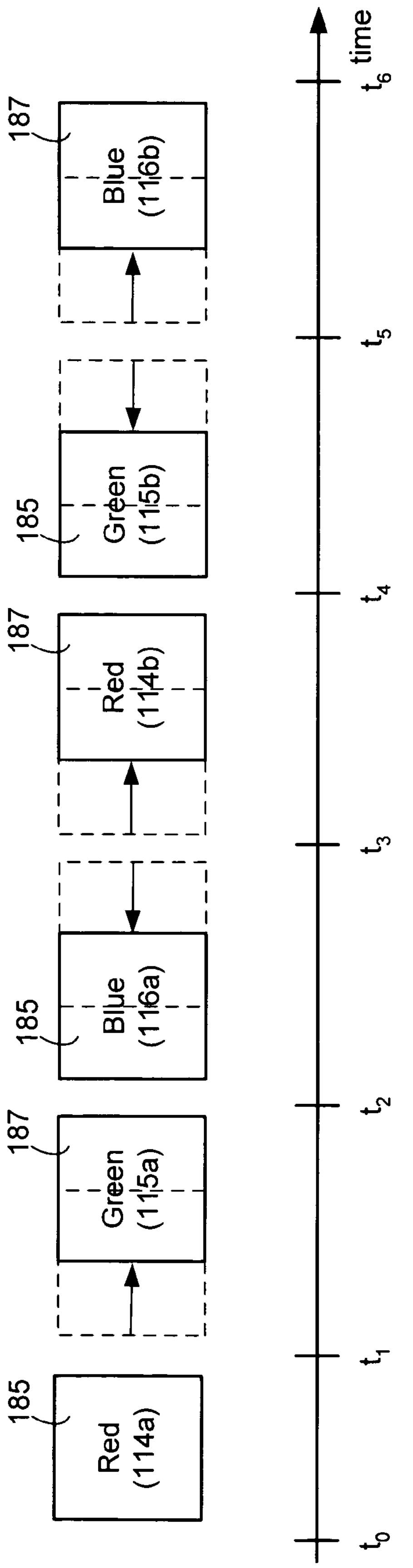
FIG. 11 illustrates an exemplary embodiment wherein the wobbling device horizontally shifts the display position of the image sub-frames between two image sub-frame locations according to one exemplary embodiment.

Although FIG. 9 shows the image sub-frames shifting diagonally between the first and second image sub-frame locations (185, 186), the image sub-frames may also shift vertically or horizontally. FIG. 10 illustrates an exemplary embodiment wherein the wobbling device vertically shifts the display position of the image sub-frames between two image sub-frame locations. FIG. 11 illustrates an exemplary embodiment wherein the wobbling device horizontally shifts the display position of the image sub-frames between two image sub-frame locations.

The shifting of image sub-frames between two image sub-frame locations illustrated in FIGS. 9–11 is exemplary only and is not limited to two image sub-frame locations. Rather, the image sub-frames may be shifted and displayed in any of a number image sub-frame locations. In general, if "n" represents the number of image sub-frame locations and "m" represents the number of colors generated by the sequential color device (102; FIG. 4), the image processing unit (106; FIG. 4) generates n*m image sub-frames corresponding to an image that is to be displayed, where n*m is n multiplied by m. The n*m image sub-frames are sequentially displayed and evenly distributed among the n sub-frame locations. Thus, m sub-frames will be displayed in each of the n image sub-frame locations.

Figure 12:
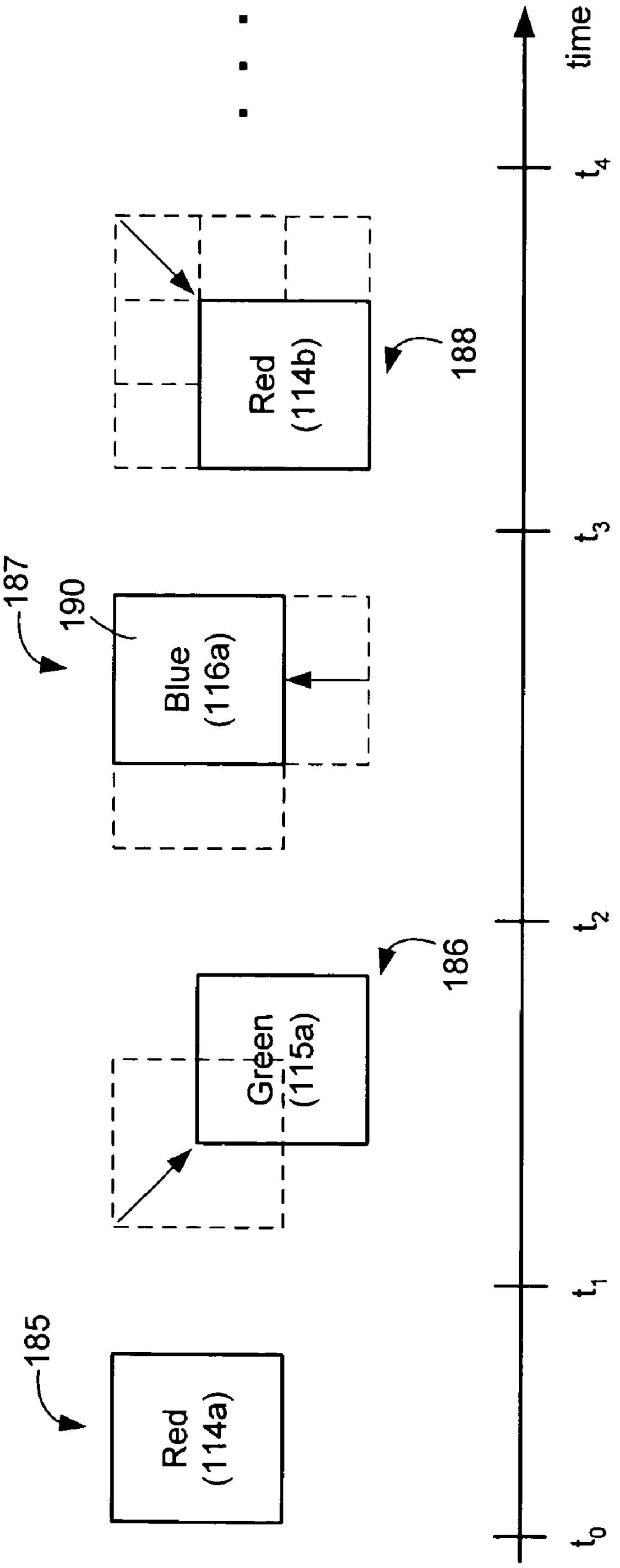
FIG. 12 illustrates an exemplary embodiment wherein the wobbling device shifts the display position of the image sub-frames between four image sub-frame locations according to one exemplary embodiment.

For example, if there are four image sub-frame locations (i.e.; n=4), as in FIG. 12, and if the sequential color device (102; FIG. 4) generates the three primary colors (i.e.; m=3), the image processing unit (106; FIG. 4) generates twelve image sub-frames corresponding to the image that is to be displayed. In one embodiment, the display position of the twelve image sub-frames is shifted by the wobbling device (104; FIG. 4) between each color change such that each color image sub-frame is displayed in one of the four image sub-frame locations. The exact sequence and positioning of the image sub-frames will vary as best serves a particular application.

FIG. 12 illustrates an exemplary embodiment wherein the wobbling device (104; FIG. 4) shifts the display position of the image sub-frames between four image sub-frame locations. First, a red image sub-frame (114*a*) is displayed in the first image sub-frame location (185) between times $t_0$ and $t_1$. The wobbling device (104; FIG. 4) then shifts the position of the light beam bearing the image sub-frames such that the next image sub-frame, which is a green image sub-frame (115*a*), is displayed in the second image sub-frame location (186) between times $t_1$ and $t_2$. The wobbling device (104; FIG. 4) then shifts the position of the light beam bearing the image sub-frames such that the next image sub-frame, which is a blue image sub-frame (116*a*), is displayed in the third image sub-frame location (187) between times $t_2$ and $t_3$. The wobbling device (104; FIG. 4) then shifts the position of the light beam bearing the image sub-frames such that the next image sub-frame, which is a second red image sub-frame (114*b*), is displayed in the fourth image sub-frame location (188) between times $t_3$ and $t_4$. This process of alternating the position of the image sub-frames is repeated for the remaining image sub-frames that are to be displayed (not shown). Thus, a second green image sub-frame is displayed in the first image sub-frame location (185), a second blue image sub-frame is displayed in the second image sub-frame location (186), a third red image sub-frame is displayed in the third image sub-frame location (187), a third green image sub-frame is displayed in the fourth image sub-frame location (188), a third blue image sub-frame is displayed in the first image sub-frame location (185), a fourth red image sub-frame is displayed in the second image sub-frame location (186), a fourth green image sub-frame is displayed in the third image sub-frame location (187), and a fourth blue image sub-frame is displayed in the fourth image sub-frame location (188). The order in which the primary colors are displayed may vary as best serves a particular application. For example, blue may be displayed first instead of red. Furthermore, red, green, and blue are exemplary colors that may be sequentially displayed. It will be understood that any combination of colors may be sequentially displayed.

As mentioned, the pattern in which the wobbling device (104; FIG. 4) causes the image sub-frames to be displayed in FIG. 12 is exemplary only. As will be understood by one skilled in the art, a number of possible patterns may be used by the wobbling device (104; FIG. 4) to cause the image sub-frames to be displayed in different spatial locations. For example, in one of many alternative embodiments, the first image sub-frame may be displayed in the first image sub-frame location (185), the second image sub-frame in the second image sub-frame location (186), the third image sub-frame in the first image sub-frame location (185), the fourth image sub-frame in the second image sub-frame location (186), the fifth image sub-frame in the first image sub-frame location (185), the sixth image sub-frame in the second image sub-frame location (186), the seventh image sub-frame in the third image sub-frame location (187), the eighth image sub-frame in the fourth image sub-frame location (188), the ninth image sub-frame in the third image sub-frame location (187), the tenth image sub-frame in the fourth image sub-frame location (188), the eleventh image sub-frame in the third image sub-frame location (187), and the twelfth image sub-frame in the fourth image sub-frame location (188).

Figure 13:
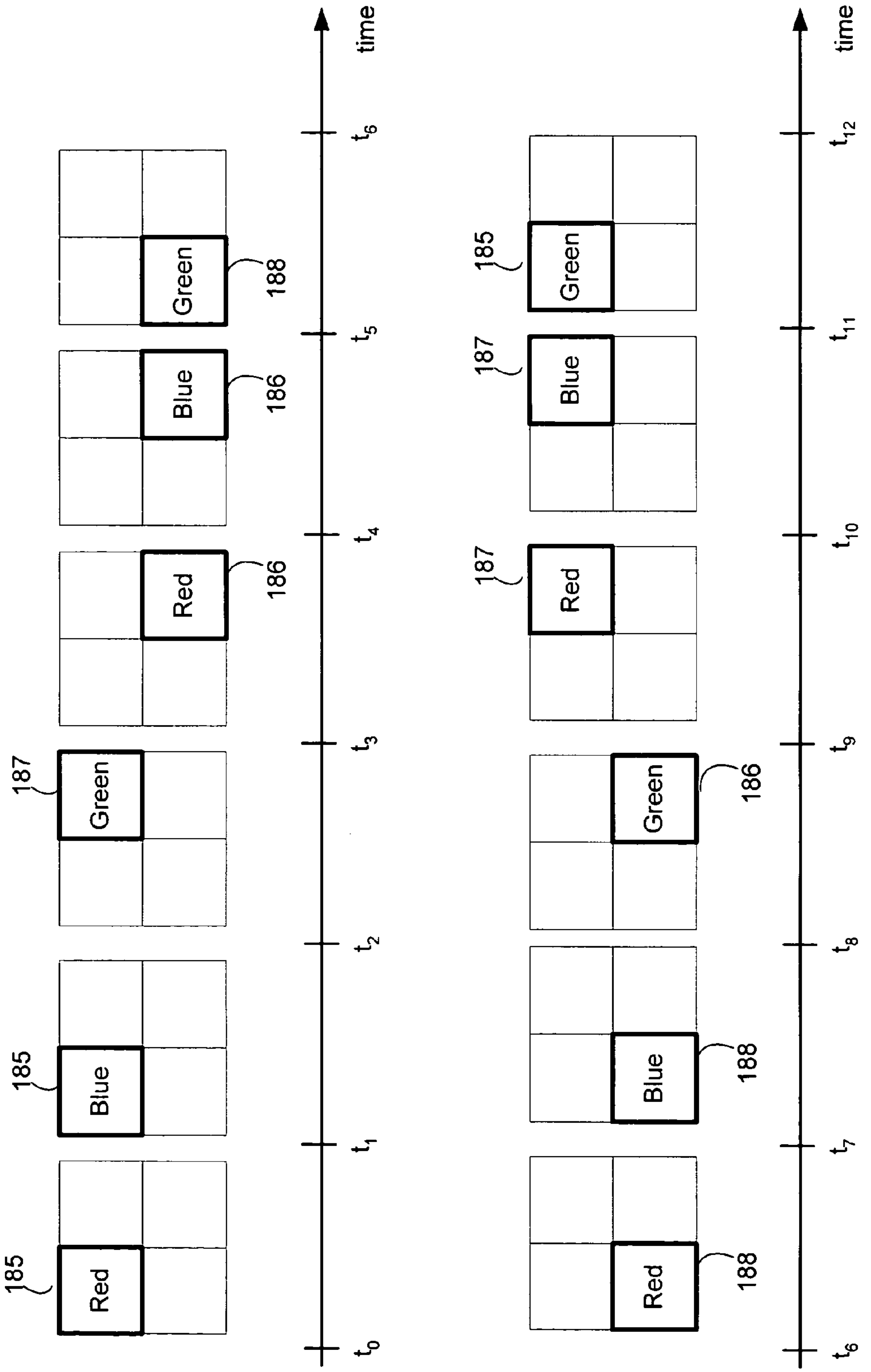
FIG. 13 illustrates an exemplary alternative embodiment wherein the wobbling device shifts the display position of the image sub-frames between four image sub-frame locations such that two of the primary colors are displayed in the same image sub-frame location before the third primary color is displayed in a different image sub-frame location according to one exemplary embodiment.

FIG. 13 illustrates an exemplary alternative embodiment wherein the wobbling device (104; FIG. 4) shifts the display position of the image sub-frames between four image sub-frame locations. FIG. 13 shows that the wobbling device (104; FIG. 4) shifts the position of the light beam bearing the image sub-frames such that two of the primary colors are displayed in the same image sub-frame location before the third primary color is displayed in a different image sub-frame location. Displaying two of the primary colors in a particular image sub-frame location and then displaying the third primary color in a new image sub-frame location is advantageous in many exemplary display systems. For example, FIG. 13 shows that red and blue image sub-frames are displayed in the first image sub-frame location (185) between times $t_0$ and $t_2$. The wobbling device (104; FIG. 4) then shifts the position of the light beam bearing the image sub-frames such that the next image sub-frame, which is a green image sub-frame, is displayed in the third image sub-frame location (187) between times $t_2$ and $t_3$. The wobbling device (104; FIG. 4) then shifts the position of the light beam bearing the image sub-frames such that the next two image sub-frames, which are red and blue image sub-frames, are displayed in the second image sub-frame location (186) between times $t_3$ and $t_5$. The wobbling device (104; FIG. 4) then shifts the position of the light beam bearing the image sub-frames such that the next image sub-frame, which is a green image sub-frame, is displayed in the fourth image sub-frame location (188) between times $t_5$ and $t_6$. FIG. 13 illustrates the remaining image sub-frame location contents between times $t_6$ and $t_{12}$ according to the exemplary embodiment.

Figure 14:
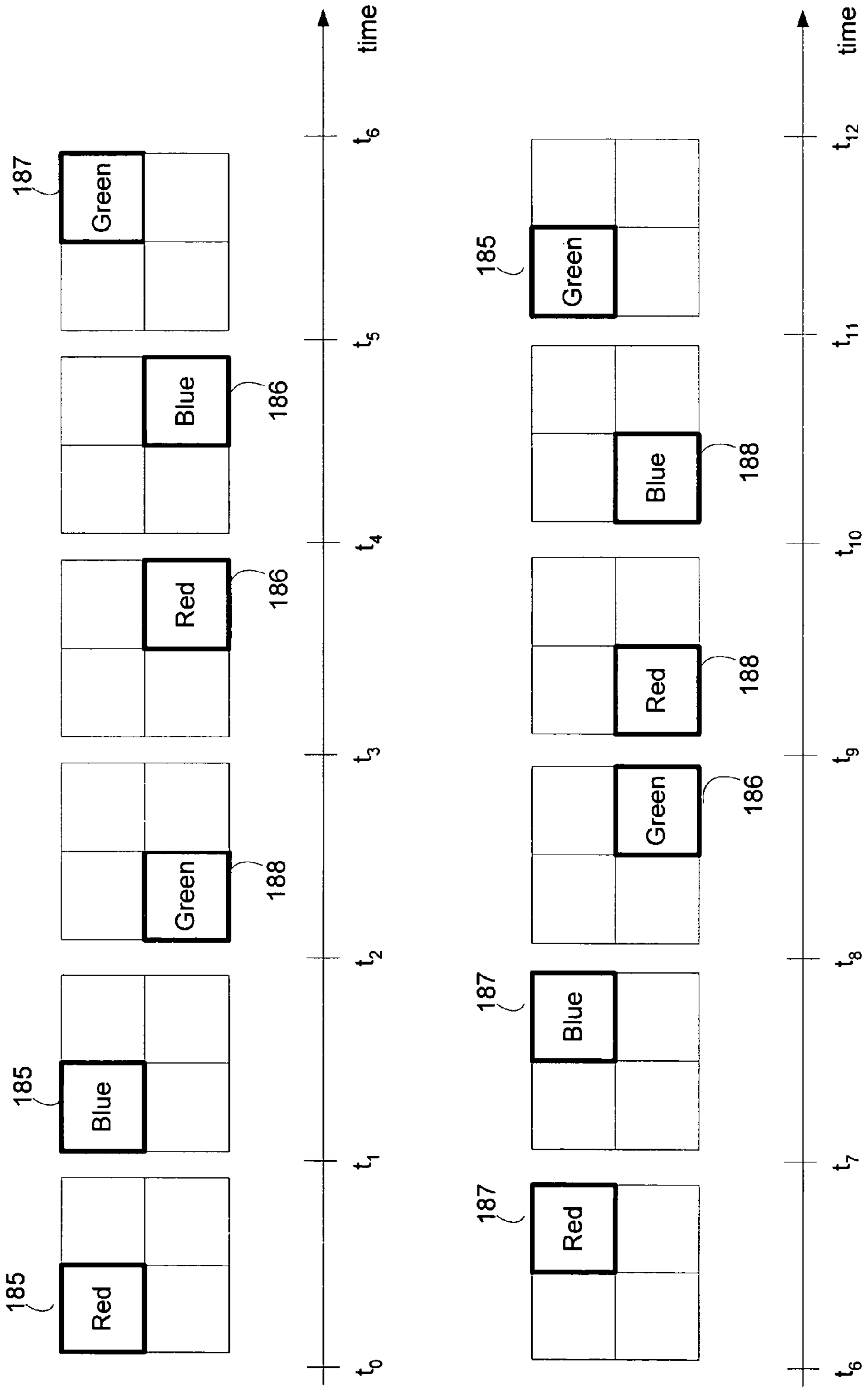
FIG. 14 illustrates another exemplary alternative embodiment wherein the wobbling device shifts the display position of the image sub-frames between four image sub-frame locations such that two of the primary colors are displayed in the same image sub-frame location before the third primary color is displayed in a different image sub-frame location according to one exemplary embodiment.

FIG. 14 shows another exemplary embodiment wherein the wobbling device (104; FIG. 4) shifts the position of the light beam bearing the image sub-frames such that two of the primary colors are displayed in the same image sub-frame location before the third primary color is displayed in a different image sub-frame location. FIG. 13 and FIG. 14 are exemplary of the many possible display sequences of the color image sub-frames as will be understood by one skilled in the art.

Figure 15:
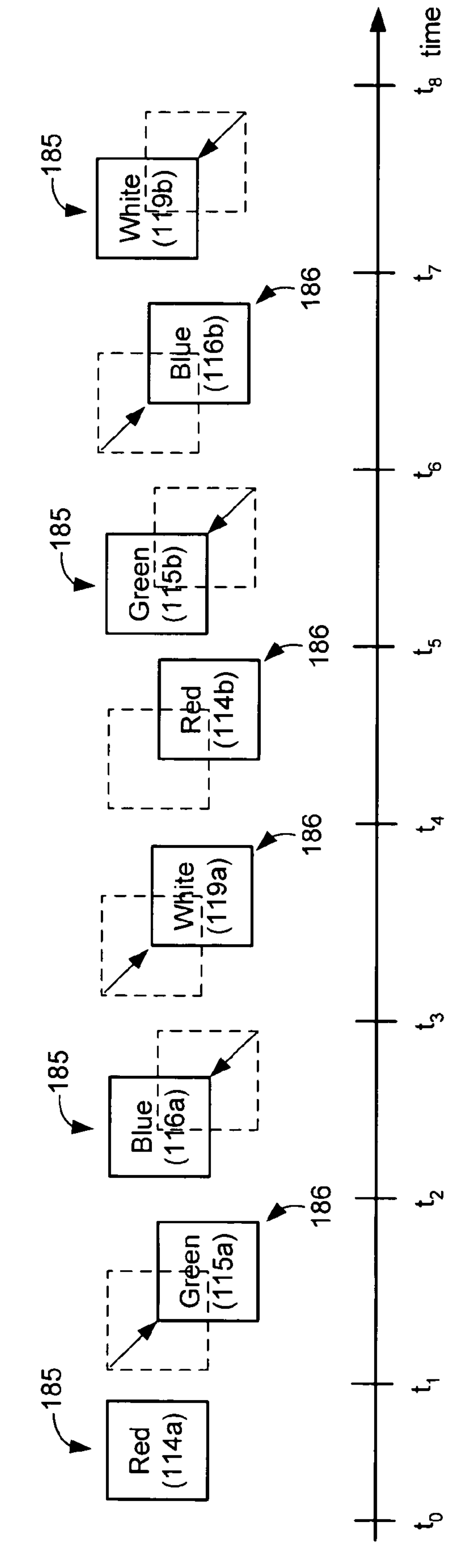
FIG. 15 illustrates an second exemplary embodiment wherein the wobbling device shifts the display position of the image sub-frames between four image sub-frame locations.

FIG. 15 illustrates an exemplary embodiment wherein n=2 and m=4. In other words, there are two image sub-frame locations and four colors generated by the sequential color device (102; FIG. 4). Thus, eight image sub-frames are generated by the image processing unit (106; FIG. 4) and are sequentially displayed. The four colors, in the exemplary scenario of FIG. 15 are red, green, blue, and white.

As shown in FIG. 15, a red image sub-frame (114*a*) is first displayed in the first image sub-frame location (185) between times $t_0$ and $t_1$. The wobbling device (104; FIG. 4) then shifts the position of the light beam bearing the image sub-frames such that the next image sub-frame, which is a green image sub-frame (115*a*), is displayed in the second image sub-frame location (186) between times $t_1$ and $t_2$. The wobbling device (104; FIG. 4) then shifts the position of the light beam bearing the image sub-frames such that the next image sub-frame, which is a blue image sub-frame (116*a*), is displayed in the first image sub-frame location (185) between times $t_2$ and $t_3$. The wobbling device (104; FIG. 4) then shifts the position of the light beam bearing the image sub-frames such that the next image sub-frame, which is a white image sub-frame (119*a*), is displayed in the second image sub-frame location (186) between times $t_3$ and $t_4$. Because an even number of colors are displayed, the wobbling device (104; FIG. 4) does not shift the position of the light beam bearing the image sub-frames at time $t_4$ so that the second red image sub-frame (114*b*) is displayed in the second image sub-frame location (186) between times $t_4$ and $t_5$. The alternating process then resumes and the second green image sub-frame (115*b*) is displayed in the first image sub-frame location (185) between times $t_5$ and $t_6$, the second blue image sub-frame (116*b*) is displayed in the second image sub-frame location (186) between times $t_6$ and $t_7$, and the second white image sub-frame (119*b*) is displayed in the second image sub-frame location (186) between times $t_7$ and $t_8$.

Shifting the display position of the image sub-frames between each color change allows the wobbling device (104; FIG. 4) to shift the locations of the pixels in an image that is to be displayed m times faster than if the wobbling device (104; FIG. 4) were to shift the display position of the image sub-frames after each of the m colors is displayed in a particular image sub-frame location. For example, in the examples explained in connection with FIG. 9 and FIG. 12, the wobbling device (104; FIG. 4) shifts the locations of the pixels three times faster than if the wobbling device (104; FIG. 4) were to shift the display position of the image sub-frames after all three of the primary colors are displayed in each image sub-frame location. These high rates of pixel shifting are advantageous in many applications because high rates of pixel shifting are less detectable to the human eye than are lower rates.

Returning to FIG. 4, in one embodiment, the image processing unit (106) includes a system timing unit (154). In an alternative embodiment, the system timing unit (154) is a separate component of the display system (100) and is not integrated into the image processing unit (106). However, for explanatory purposes, the exemplary display system (100) of FIG. 4 will be described with a system timing unit (154) that is integrated into the image processing unit (106). The system timing unit (154) communicates, for example, with the frame rate conversion unit (150), the resolution adjustment function (151), the image processing unit (106), the sequential color device (102), the SLM (103), and the wobbling device (104). In an exemplary embodiment, the system timing unit (154) synchronizes the buffering and conversion of the image data to create an image frame, the processing of the image frame to adjust the resolution of the image data to the resolution of display system (100), the generation of the sub-frames, the modulation of the image sub-frames, and the display and positioning of the image sub-frames. Accordingly, the system timing unit (154) controls the timing of display system (100) such that an entire group of image sub-frames are temporally and spatially displayed in different positions by the display optics (106) in a manner that correctly displays the finally displayed image.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A display system for displaying an image, comprising:

a modulator configured to produce a light beam that sequentially bears a plurality of color image sub-frames, wherein each color image sub-frame corresponds to one color in a plurality of colors;

display optics configured to display said light beam such that said plurality of color image sub-frames are successively displayed to form said image; and a wobbling device configured to displace said light beam between display of each of said color image sub-frames such that a color image sub-frame corresponding to each color in said plurality of colors is displayed in each of a number of image sub-frame locations.

2. The system of claim 1, further comprising:

an image processing unit configured to process image data defining said image and generate said image sub-frames; and a sequential color device configured to shine a color light beam on a face of said modulator, said color light beam having a color that sequentially rotates through said plurality of colors;

wherein said modulator is configured to modulate said color light beam according to said number of color image sub-frames to produce said light beam bearing said plurality of color image sub-frames.

3. The system of claim 1, wherein said plurality of color image sub-frames comprises a number of color image sub-frames equal to said number of image sub-frame locations multiplied by a number of colors in said plurality of colors.

4. The system of claim 3, wherein said number of image sub-frame locations comprises:

a first image sub-frame location; and a second image sub-frame location;

wherein said second image sub-frame location is spatially offset by an offset distance from said first image sub-frame location.

5. The system of claim 4, wherein said offset distance comprises a vertical offset distance and a horizontal offset distance, said second image sub-frame location being vertically offset from said first image sub-frame location by said vertical offset distance and horizontally offset from said first image sub-frame location by said horizontal offset distance.

6. The system of claim 5, wherein said vertical offset distance is and said horizontal offset distance are substantially equal to one-half of a pixel.

7. The system of claim 4, wherein said offset distance comprises a vertical offset distance, said second image sub-frame location being vertically offset from said first image sub-frame location by said vertical offset distance.

8. The system of claim 4, wherein said offset distance comprises a horizontal offset distance, said second image sub-frame location being horizontally offset from said first image sub-frame location by said horizontal offset distance.

9. The system of claim 4, wherein said successive display of said plurality of color image sub-frames comprises alternately displaying said plurality of color image sub-frames in said first image sub-frame location and in said second image sub-frame location.

10. The system of claim 9, wherein said plurality of colors comprises a first color, a second color, and a third color.

11. The system of claim 10, wherein said wobbling device is further configured to displace said light beam between the display of each of said plurality of color image sub-frames in a manner wherein, in the following order:

a first color image sub-frame corresponding to said first color is displayed in said first image sub-frame location;

a first color image sub-frame corresponding to said second color is displayed in said second image sub-frame location;

a first color image sub-frame corresponding to said third color is displayed in said first image sub-frame location;

a second color image sub-frame corresponding to said first color is displayed in said second image sub-frame location;

a second color image sub-frame corresponding to said second color is displayed in said first image sub-frame location; and a second color image sub-frame corresponding to said third color is displayed in said second image sub-frame location.

12. The system of claim 9, wherein said plurality of colors comprises a first color, a second color, a third color, and a fourth color.

13. The system of claim 12, wherein said wobbling device is further configured to displace said light beam between the display of each of said plurality of color image sub-frames in a manner wherein, in the following order:

a first color image sub-frame corresponding to said first color is displayed in said first image sub-frame location;

a first color image sub-frame corresponding to said second color is displayed in said second image sub-frame location;

a first color image sub-frame corresponding to said third color is displayed in said first image sub-frame location;

a first color image sub-frame corresponding to said fourth color is displayed in said second image sub-frame location;

a second color image sub-frame corresponding to said first color is displayed in said second image sub-frame location;

a second color image sub-frame corresponding to said second color is displayed in said first image sub-frame location;

a second color image sub-frame corresponding to said third color is displayed in said second image sub-frame location; and a second color image sub-frame corresponding to said fourth color is displayed in said first image sub-frame location.

14. The system of claim 3, wherein said number of image sub-frame locations comprises:

a first image sub-frame location;

a second image sub-frame location;

a third image sub-frame location; and a fourth image sub-frame location.

15. The system of claim 14, wherein:

said second image sub-frame location is spatially offset by a first offset is distance from said first image sub-frame location;

said third image sub-frame location is spatially offset by a second offset distance from said second image sub-frame location; and said fourth image sub-frame location is spatially offset by a third offset distance from said third image sub-frame location.

16. The system of claim 15, wherein:

said first offset distance comprises a vertical offset distance and a horizontal offset distance, said second image sub-frame location being vertically offset from said first image sub-frame location by said vertical offset distance and horizontally offset from said first image sub-frame location by said horizontal offset distance;

said second offset distance comprises said vertical offset distance, said third image sub-frame location being vertically offset from said second image sub-frame location by said vertical offset distance; and said third offset distance comprises said vertical offset distance and said horizontal offset distance, said fourth image sub-frame location being vertically offset from said first image sub-frame location by said vertical offset distance and horizontally offset from said third image sub-frame location by said horizontal offset distance.

17. The system of claim 16, wherein said vertical offset distance and said horizontal offset distance are substantially equal to one-half of a pixel.

18. The system of claim 15, wherein said successive display of said plurality of color image sub-frames comprises alternately displaying said plurality of color image sub-frames in said first, second, third, and fourth image sub-frame locations.

19. The system of claim 18, wherein said plurality of colors comprises a first color, a second color, and a third color.

20. The system of claim 19, wherein said wobbling device is is further configured to displace said light beam between the display of each of said plurality of color image sub-frames in a manner wherein, in the following order:

a first color image sub-frame corresponding to said first color is displayed in said first image sub-frame location;

a first color image sub-frame corresponding to said second color is displayed in said second image sub-frame location;

a first color image sub-frame corresponding to said third color is displayed in said third image sub-frame location;

a second color image sub-frame corresponding to said first color is displayed in said fourth image sub-frame location;

a second color image sub-frame corresponding to said second color is displayed in said first image sub-frame location;

a second color image sub-frame corresponding to said third color is displayed in said second image sub-frame location;

a third color image sub-frame corresponding to said first color is displayed in said third image sub-frame location;

a third color image sub-frame corresponding to said second color is displayed in said fourth image sub-frame location;

a third color image sub-frame corresponding to said third color is displayed in said first image sub-frame location;

a fourth color image sub-frame corresponding to said first color is displayed in said second image sub-frame location;

a fourth color image sub-frame corresponding to said second color is displayed in said third image sub-frame location; and a fourth color image sub-frame corresponding to said third color is displayed in said fourth image sub-frame location.

21. The system of claim 19, wherein said wobbling device is further configured to displace said light beam between the display of each of said plurality of color image sub-frames in a manner wherein, in the following order:

a first color image sub-frame corresponding to said first color is displayed in said first image sub-frame location;

a first color image sub-frame corresponding to said second color is displayed in said second image sub-frame location;

is a first color image sub-frame corresponding to said third color is displayed in said first image sub-frame location;

a second color image sub-frame corresponding to said first color is displayed in said second image sub-frame location;

a second color image sub-frame corresponding to said second is displayed in said first image sub-frame location;

a second color image sub-frame corresponding to said third color is displayed in said second image sub-frame location;

a third color image sub-frame corresponding to said first color is displayed in said third image sub-frame location;

a third color image sub-frame corresponding to said second color is displayed in said fourth image sub-frame location;

a third color image sub-frame corresponding to said third color is displayed in said third image sub-frame location;

a fourth color image sub-frame corresponding to said first color is displayed in said fourth image sub-frame location;

a fourth color image sub-frame corresponding to said second color is displayed in said third image sub-frame location; and a fourth color image sub-frame corresponding to said third color is displayed in said fourth image sub-frame location.

22. The system of claim 1, wherein said modulator comprises a liquid crystal on silicon (LCOS) array.

23. The system of claim 1, wherein said modulator comprises a micromirror array.

24. The system of claim 1, wherein said wobbling device comprises a galvanometer mirror.

25. The system of claim 2, wherein said sequential color device comprises a color wheel.

26. A display system for displaying an image, comprising:

a modulator configured to produce a light beam that sequentially bears a plurality of color image sub-frames, said plurality of color image sub-frames divided into a number of groups of first, second, and third color image sub-frames of different colors;

display optics configured to display said light beam such that said plurality of color image sub-frames are successively displayed to form said image; and a wobbling device configured to displace said light beam such that said first and second image sub-frames in each of said number of groups are displayed in one of a number of image sub-frame locations and said third image sub-frame in each of said number of groups is displayed in another of said number of image sub-frame locations.

27. The system of claim 26, further comprising:

an image processing unit configured to process image data defining said image and generate said image sub-frames; and a sequential color device configured to shine a color light beam on a face of said modulator, said color light beam having a color that sequentially rotates through said plurality of colors;

wherein said modulator is configured to modulate said color light beam according to said number of color image sub-frames to produce said light beam bearing said plurality of color image sub-frames.

28. The system of claim 26, wherein said number of groups is equal to said number of image sub-frame locations.

29. The system of claim 28, wherein said number of image sub-frame locations comprises:

a first image sub-frame location;

a second image sub-frame location;

a third image sub-frame location; and a fourth image sub-frame location.

30. The system of claim 29, wherein:

said second image sub-frame location is spatially offset by a first offset distance from said first image sub-frame location;

said third image sub-frame location is spatially offset by a second offset distance from said second image sub-frame location; and said fourth image sub-frame location is spatially offset by a third offset distance from said third image sub-frame location.

31. The system of claim 30, wherein:

said first offset distance comprises a vertical offset distance and a horizontal offset distance, said second image sub-frame location being vertically offset from said first image sub-frame location by said vertical offset distance and horizontally offset from said first image sub-frame location by said horizontal offset distance;

said second offset distance comprises said vertical offset distance, said third image sub-frame location being vertically offset from said second image sub-frame location by said vertical offset distance; and said third offset distance comprises said vertical offset distance and said horizontal offset distance, said fourth image sub-frame location being vertically offset from said first image sub-frame location by said vertical offset distance and horizontally offset from said third image sub-frame location by said horizontal offset distance.

32. The system of claim 31, wherein said vertical offset distance and said horizontal offset distance are substantially equal to one-half of a pixel.

33. The system of claim 30, wherein said number of groups comprises a first, second, third, and fourth group of color image sub-frames.

34. The system of claim 33, wherein said wobbling device is further configured to displace said light beam such that:

said first and second color image sub-frames in said first group are displayed in said first image sub-frame location;

said third color image sub-frame in said first group is displayed in said third image sub-frame location;

said first and second color image sub-frames in said second group are displayed in said second image sub-frame location;

said third color image sub-frame in said second group is displayed in said fourth image sub-frame location;

said first and second color image sub-frames in said third group are displayed in said fourth image sub-frame location;

said third color image sub-frame in said third group is displayed in said second image sub-frame location;

said first and second color image sub-frames in said fourth group are displayed in said third image sub-frame location; and said third color image sub-frame in said fourth group is displayed in said first image sub-frame location.

35. The system of claim 33, wherein said wobbling device is further configured to displace said light beam such that:

said first and second color image sub-frames in said first group are displayed in said first image sub-frame location;

said third color image sub-frame in said first group is displayed in said fourth image sub-frame location;

said first and second color image sub-frames in said second group are displayed in said second image sub-frame location;

said third color image sub-frame in said second group is displayed in said third image sub-frame location;

said first and second color image sub-frames in said third group are displayed in said third image sub-frame location;

said third color image sub-frame in said third group is displayed in said second image sub-frame location;

said first and second color image sub-frames in said fourth group are displayed in said fourth image sub-frame location; and said third color image sub-frame in said fourth group is displayed in said first image sub-frame location.

36. The system of claim 26, wherein:

said first image sub-frame in each of said groups comprises a red color image sub-frame;

said second image sub-frame in each of said groups comprises a blue color image sub-frame; and said third image sub-frame in each of said groups comprises a green color image sub-frame.

37. A method of displaying an image, said method comprising:

producing a light beam that sequentially bears a plurality of color image sub-frames with a modulator, wherein each color image sub-frame uniquely corresponds to one color in a plurality of colors;

displaying said light beam such that said plurality of color image sub-frames are successively displayed to form said image; and displacing said light beam between display of each of said color image sub-frames such that a color image sub-frame corresponding to each color in said plurality of colors is displayed in each of a number of image sub-frame locations.

38. The method of claim 37, further comprising:

processing image data defining said image and generating said image sub-frames;

shining a color light beam on a face of said modulator, said color light beam having a color that sequentially rotates through said plurality of colors ; and modulating said color light beam according to said number of color image sub-frames to produce said light beam bearing said plurality of color image sub-frames.

39. The method of claim 37, wherein said plurality of color image sub-frames comprises a number of color image sub-frames equal to said number of image sub-frame locations multiplied by said plurality of colors.

40. The method of claim 39, wherein said number of image sub-frame locations comprises:

a first image sub-frame location; and a second image sub-frame location;

wherein said second image sub-frame location is spatially offset by an offset distance from said first image sub-frame location.

41. The method of claim 40, wherein said offset distance comprises a vertical offset distance and a horizontal offset distance, said second image sub-frame location being vertically offset from said first image sub-frame location by said vertical offset distance and horizontally offset from said first image sub-frame location by said horizontal offset distance.

42. The method of claim 41, wherein said vertical offset distance and said horizontal offset distance are substantially equal to one-half of a pixel.

43. The method of claim 40, wherein said offset distance comprises a vertical offset distance, said second image sub-frame location being vertically offset from said first image sub-frame location by said vertical offset distance.

44. The method of claim 40, wherein said offset distance comprises a horizontal offset distance, said second image sub-frame location being horizontally offset from said first image sub-frame location by said horizontal offset distance.

45. The method of claim 40, wherein said step of displaying said light beam comprises alternately displaying said plurality of color image sub-frames in said first image sub-frame location and in said second image sub-frame location.

46. The method of claim 45, wherein said plurality of colors comprises a first color, a second color, and a third color.

47. The method of claim 46, wherein said step of displaying said light beam comprises, in the following order:

displaying a first color image sub-frame corresponding to said first color in said first image sub-frame location;

displaying a first color image sub-frame corresponding to said second color in said second image sub-frame location;

displaying a first color image sub-frame corresponding to said third color in said first image sub-frame location;

displaying a second color image sub-frame corresponding to said first color in said second image sub-frame location;

displaying a second color image sub-frame corresponding to said second color in said first image sub-frame location; and displaying a second color image sub-frame corresponding to said third color in said second image sub-frame location.

48. The method of claim 45, wherein said plurality of colors comprises a first color, a second color, a third color, and a fourth color.

49. The method of claim 48, wherein said step of displaying said light beam comprises, in the following order:

displaying a first color image sub-frame corresponding to said first color of said first group in said first image sub-frame location;

displaying a first color image sub-frame corresponding to said second color of said first group in said second image sub-frame location;

displaying a first color image sub-frame corresponding to said third color in said first image sub-frame location;

displaying a first color image sub-frame corresponding to said fourth color in said second image sub-frame location;

displaying a second color image sub-frame corresponding to said first color in said second image sub-frame location;

displaying a second color image sub-frame corresponding to said second color in said first image sub-frame location;

is displaying a second color image sub-frame corresponding to said third color in said second image sub-frame location; and displaying a second color image sub-frame corresponding to said fourth color in said first image sub-frame location.

50. The method of claim 39, wherein said number of image sub-frame locations comprises:

a first image sub-frame location;

a second image sub-frame location;

a third image sub-frame location; and a fourth image sub-frame location.

51. The method of claim 50, wherein:

said second image sub-frame location is spatially offset by a first offset distance from said first image sub-frame location;

said third image sub-frame location is spatially offset by a second offset distance from said second image sub-frame location; and said fourth image sub-frame location is spatially offset by a third offset distance from said third image sub-frame location.

52. The method of claim 51, wherein:

said first offset distance comprises a vertical offset distance and a horizontal offset distance, said second image sub-frame location being vertically offset from said first image sub-frame location by said vertical offset distance and horizontally offset from said first image sub-frame location by said horizontal offset distance;

said second offset distance comprises said vertical offset distance, said third image sub-frame location being vertically offset from said second image sub-frame location by said vertical offset distance; and said third offset distance comprises said vertical offset distance and said horizontal offset distance, said fourth image sub-frame location being vertically offset from said first image sub-frame location by said vertical offset distance and horizontally offset from said third image sub-frame location by said horizontal offset distance.

53. The method of claim 52, wherein said vertical offset distance and said horizontal offset distance are substantially equal to one-half of a pixel.

54. The method of claim 51, wherein said step of displaying said light beam comprises alternately displaying said plurality of color image sub-frames in said first, second, third, and fourth image sub-frame locations.

55. The method of claim 54, wherein said plurality of colors comprises a first color, a second color, and a third color.

56. The method of claim 55, wherein said step of displaying said light beam comprises, in the following order:

displaying a first color image sub-frame corresponding to said first color in said first image sub-frame location;

displaying a first color image sub-frame corresponding to said second color in said second image sub-frame location;

displaying a first color image sub-frame corresponding to said third color in said third image sub-frame location;

displaying a second color image sub-frame corresponding to said first color in said fourth image sub-frame location;

displaying a second color image sub-frame corresponding to said second color in said first image sub-frame location;

displaying a second color image sub-frame corresponding to said third color in said second image sub-frame location;

displaying a third color image sub-frame corresponding to said first color in said third image sub-frame location;

displaying a third color image sub-frame corresponding to said second color in said fourth image sub-frame location;

displaying a third color image sub-frame corresponding to said third color in said first image sub-frame location;

displaying a fourth color image sub-frame corresponding to said first color in said second image sub-frame location;

is displaying a fourth color image sub-frame corresponding to said second color in said third image sub-frame location; and displaying a fourth color image sub-frame corresponding to said third color in said fourth image sub-frame location.

57. The method of claim 55, wherein said step of displaying said light beam comprises:

displaying a first color image sub-frame corresponding to said first color in said first image sub-frame location;

displaying a first color image sub-frame corresponding to said second color in said second image sub-frame location;

displaying a first color image sub-frame corresponding to said third color in said first image sub-frame location;

displaying a second color image sub-frame corresponding to said first color in said second image sub-frame location;

displaying a second color image sub-frame corresponding to said second color in said first image sub-frame location;

displaying a second color image sub-frame corresponding to said third color in said second image sub-frame location;

displaying a third color image sub-frame corresponding to said first color in said third image sub-frame location;

displaying a third color image sub-frame corresponding to said second color in said fourth image sub-frame location;

displaying a third color image sub-frame corresponding to said third color in said third image sub-frame location;

displaying a fourth color image sub-frame corresponding to said first color in said fourth image sub-frame location;

displaying a fourth color image sub-frame corresponding to said second color in said third image sub-frame location; and displaying a fourth color image sub-frame corresponding to said third color in said fourth image sub-frame location.

58. The method of claim 37, wherein said modulator comprises a liquid crystal on silicon (LOOS) array.

59. The method of claim 37, wherein said modulator comprises a micromirror array.

60. The method of claim 37, wherein said wobbling device comprises a galvanometer mirror.

61. The method of claim 37, wherein said generating a light beam is performed with a color wheel.

62. A method of displaying an image, comprising:

producing a light beam that sequentially bears a plurality of color image sub-frames, said plurality of color image sub-frames divided into a number of groups of first, second, and third color image sub-frames of different colors;

displaying said light beam such that said plurality of color image sub-frames are successively displayed to form said image; and displacing said light beam such that said first and second image sub-frames in each of said number of groups are displayed in one of a number of image sub-frame locations and said third image sub-frame in each of said number of groups is displayed in another of said number of image sub-frame locations.

63. The method of claim 62, further comprising:

processing image data defining said image and generating said image sub-frames;

shining a color light beam on a face of said modulator, said color light beam having a color that sequentially rotates through said plurality of colors ; and modulating said color light beam according to said number of color image sub-frames to produce said light beam bearing said plurality of color image sub-frames.

64. The method of claim 62, wherein said number of groups is equal to said number of image sub-frame locations.

65. The method of claim 64, wherein said number of image sub-frame locations comprises:

a first image sub-frame location;

a second image sub-frame location;

a third image sub-frame location; and a fourth image sub-frame location.

66. The method of claim 65, wherein:

said second image sub-frame location is spatially offset by a first offset distance from said first image sub-frame location;

said third image sub-frame location is spatially offset by a second offset distance from said second image sub-frame location; and said fourth image sub-frame location is spatially offset by a third offset distance from said third image sub-frame location.

67. The method of claim 66, wherein:

said first offset distance comprises a vertical offset distance and a horizontal offset distance, said second image sub-frame location being vertically offset from said first image sub-frame location by said vertical offset distance and horizontally offset from said first image sub-frame location by said horizontal offset distance;

said second offset distance comprises said vertical offset distance, said third image sub-frame location being vertically offset from said second image sub-frame location by said vertical offset distance; and said third offset distance comprises said vertical offset distance and said horizontal offset distance, said fourth image sub-frame location being vertically offset from said first image sub-frame location by said vertical offset distance and horizontally offset from said third image sub-frame location by said horizontal offset distance.

68. The method of claim 67, wherein said vertical offset distance and said horizontal offset distance are substantially equal to one-half of a pixel.

69. The method of claim 68, wherein said number of groups comprises a first, second, third, and fourth group of color image sub-frames.

70. The method of claim 69, wherein said step of displaying said light beam comprises:

displaying said first and second color image sub-frames of said first group in said first image sub-frame location;

displaying said third color image sub-frame of said first group in said third image sub-frame location;

displaying said first and second color image sub-frames of said second group in said second image sub-frame location;

displaying said third color image sub-frame of said second group in said fourth image sub-frame location;

displaying said first and second color image sub-frames of said third group in said fourth image sub-frame location;

displaying said third color image sub-frame of said third group in said second image sub-frame location;

displaying said first and second color image sub-frames of said fourth group in said third image sub-frame location; and displaying said third color image sub-frame of said fourth group in said first image sub-frame location.

71. The method of claim 69, wherein said step of displaying said light beam comprises:

displaying said first and second color image sub-frames of said first group in said first image sub-frame location;

displaying said third color image sub-frame of said first group in said fourth image sub-frame location;

displaying said first and second color image sub-frames of said second group in said second image sub-frame location;

displaying said third color image sub-frame of said second group in said third image sub-frame location;

displaying said first and second color image sub-frames of said third group in said third image sub-frame location;

displaying said third color image sub-frame of said third group in said second image sub-frame location;

displaying said first and second color image sub-frames of said fourth group in said fourth image sub-frame location; and displaying said third color image sub-frame of said fourth group in said first image sub-frame location.

72. The method of claim 62, wherein:

said first image sub-frame in each of said groups comprises a red color image sub-frame;

said second image sub-frame in each of said groups comprises a blue color image sub-frame; and said third image sub-frame in each of said groups comprises a green color image sub-frame.

73. A system for displaying an image, said system comprising:

means for producing a light beam that sequentially bears a plurality of color image sub-frames, wherein each color image sub-frame corresponds to one color in a plurality of colors;

means for displaying said light beam such that said plurality of color image sub-frames are successively displayed to form said image; and means for displacing said light beam between display of each of said plurality of color image sub-frames such that a color image sub-frame corresponding to each color in said plurality of colors is displayed in each of a number of image sub-frame locations.

74. A system for displaying an image, comprising:

means for producing a light beam that sequentially bears a plurality of color image sub-frames, said plurality of color image sub-frames divided into a number of groups of first, second, and third color image sub-frames of different colors;

means for displaying said light beam such that said plurality of color image sub-frames are successively displayed to form said image; and means for displacing said light beam such that said first and second image sub-frames in each of said number of groups are displayed in one of a number of image sub-frame locations and said third image sub-frame in each of said number of groups is displayed in another of said number of image sub-frame locations.

* * * * *

UNITED STATES PATENT AND TRADEMARK OFFICE

CERTIFICATE OF CORRECTION

PATENT NO. : 7,086,736 B2
APPLICATION NO. : 10/762086
DATED : August 8, 2006
INVENTOR(S) : Collins et al.

It is certified that error appears in the above-identified patent and that said Letters Patent is hereby corrected as shown below:

In the Claims

Col. 15, (line 12), after the first “distance”, delete “is”.

Col. 16 (line 65), delete “is is” and insert therefor --is--.

Col. 17 (line 47), delete “is”.

Col. 21 (line 41), delete “is”.

Col. 22 (line 53), delete “is”.

Signed and Sealed this

Twelfth Day of June, 2007

JON W. DUDAS
*Director of the United States Patent and Trademark Office*